(12) United States Patent
Yamaguchi et al.

(10) Patent No.: US 11,165,968 B2
(45) Date of Patent: Nov. 2, 2021

(54) INFORMATION PROCESSING APPARATUS, INFORMATION PROCESSING METHOD, PROGRAM, AND LIGHTING SYSTEM

(71) Applicant: Sony Group Corporation, Tokyo (JP)

(72) Inventors: Tadashi Yamaguchi, Saitama (JP); Seijiro Inaba, Kanagawa (JP); Daisuke Nakao, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/644,873

(22) PCT Filed: Sep. 12, 2018

(86) PCT No.: PCT/JP2018/033840
§ 371 (c)(1),
(2) Date: Mar. 5, 2020

(87) PCT Pub. No.: WO2019/054416
PCT Pub. Date: Mar. 21, 2019

(65) Prior Publication Data
US 2020/0288054 A1  Sep. 10, 2020

(30) Foreign Application Priority Data
Sep. 12, 2017  (JP) ................................ 2017-174518

(51) Int. Cl.
*H04N 5/222* (2006.01)
*H04N 5/235* (2006.01)
*H04N 5/225* (2006.01)

(52) U.S. Cl.
CPC ......... *H04N 5/2354* (2013.01); *H04N 5/2256* (2013.01)

(58) Field of Classification Search
CPC .. H04N 5/2251; H04N 5/2253; H04N 5/2256; H04N 5/2257; H04N 5/235;
(Continued)

(56) References Cited

U.S. PATENT DOCUMENTS

2004/0114043 A1  6/2004  Belliveau
2011/0280560 A1* 11/2011  Lin ..................... G03B 7/16
                                              396/157
(Continued)

FOREIGN PATENT DOCUMENTS

CN        1531304 A    9/2004
CN      101753847 A    6/2010
(Continued)

OTHER PUBLICATIONS

Chinese Office Action dated May 8, 2021 for corresponding Chinese Application No. 201880057505.8.

*Primary Examiner* — Kelly L Jerabek
(74) *Attorney, Agent, or Firm* — Michael Best & Friedrich LLP

(57) ABSTRACT

An information processing apparatus includes a control unit configured to determine a setting of a light emitting unit according to concept data indicating a characteristic of a desired image and a light emission result of the light emitting unit, and the control unit controls the determined setting to maintain the concept data in a case where change in an object has occurred.

18 Claims, 14 Drawing Sheets

(58) Field of Classification Search
CPC .............. H04N 5/2354; H04N 5/2351; H04N 5/23216; H04N 5/232122; G03B 7/17; G03B 15/02
See application file for complete search history.

(56) References Cited

U.S. PATENT DOCUMENTS

2013/0120608 A1    5/2013  Nakamura
2013/0230305 A1    9/2013  Falk et al.
2018/0343374 A1*  11/2018  Tamura .................. G03B 15/07

FOREIGN PATENT DOCUMENTS

| CN | 102196220 A | 9/2011 |
| CN | 102769757 A | 11/2012 |
| CN | 103095985 A | 5/2013 |
| CN | 205920310 U | 2/2017 |
| JP | 2002-027316 A | 1/2002 |
| JP | 2003-207827 A | 7/2003 |
| JP | 2005-301785 A | 10/2005 |
| JP | 2008-046410 A | 2/2008 |
| JP | 2008-298941 A | 12/2008 |
| JP | 2012-037803 A | 2/2012 |
| JP | 2012-069423 A | 4/2012 |
| WO | 2014/006435 A1 | 1/2014 |
| WO | 2017/134933 A1 | 8/2017 |

* cited by examiner

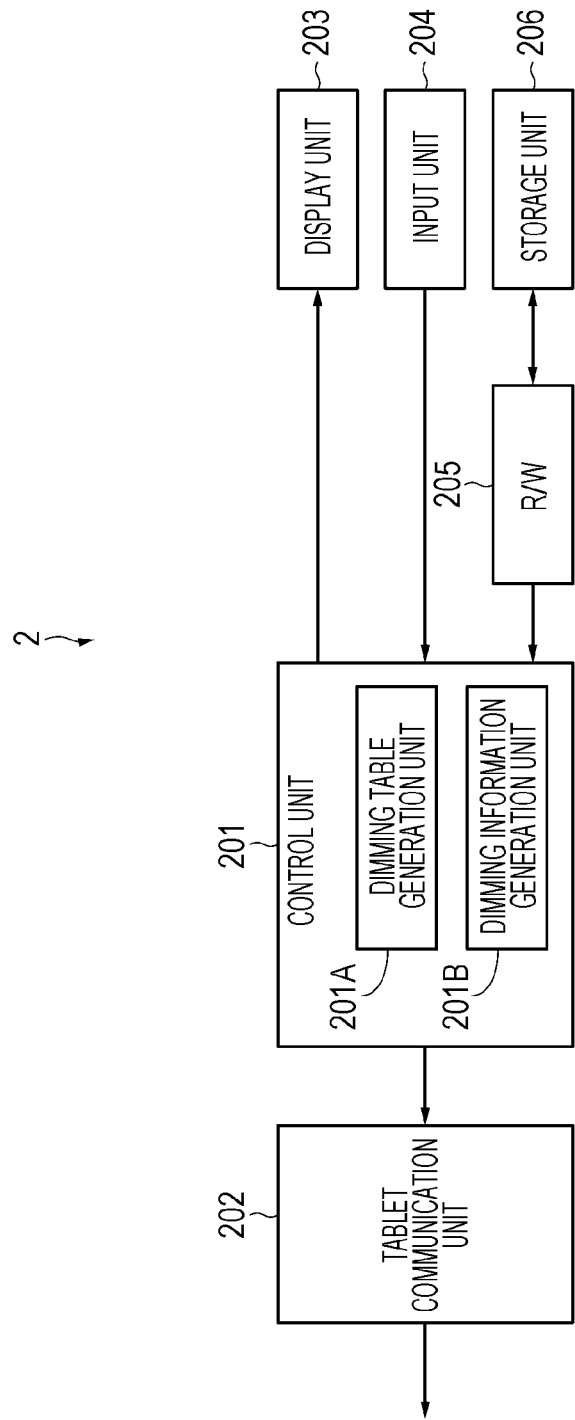

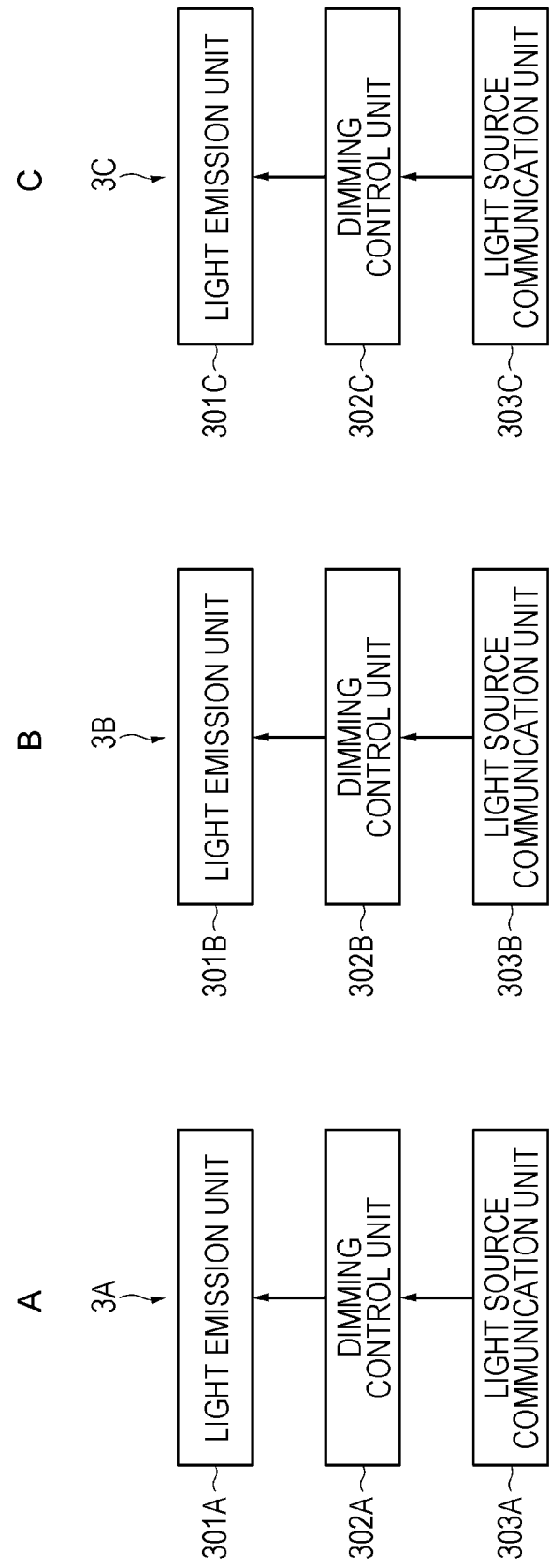

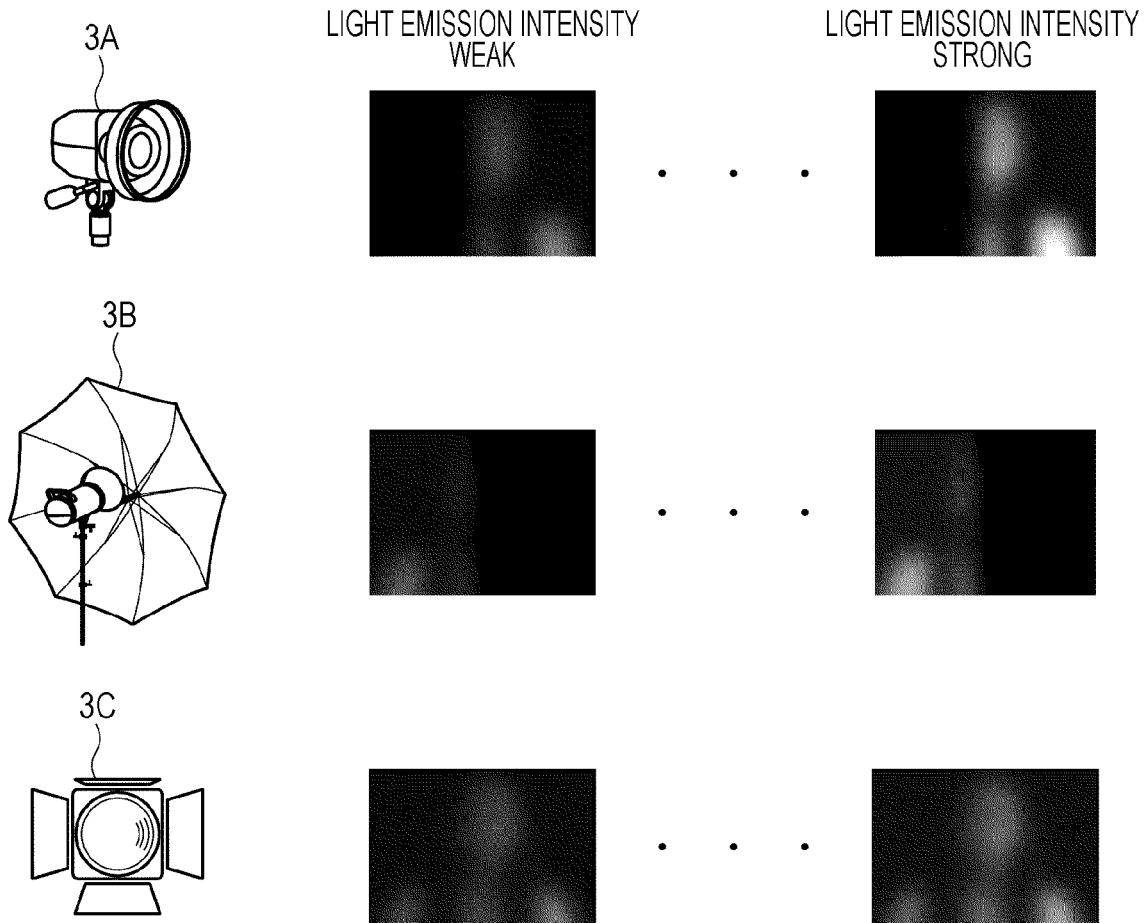

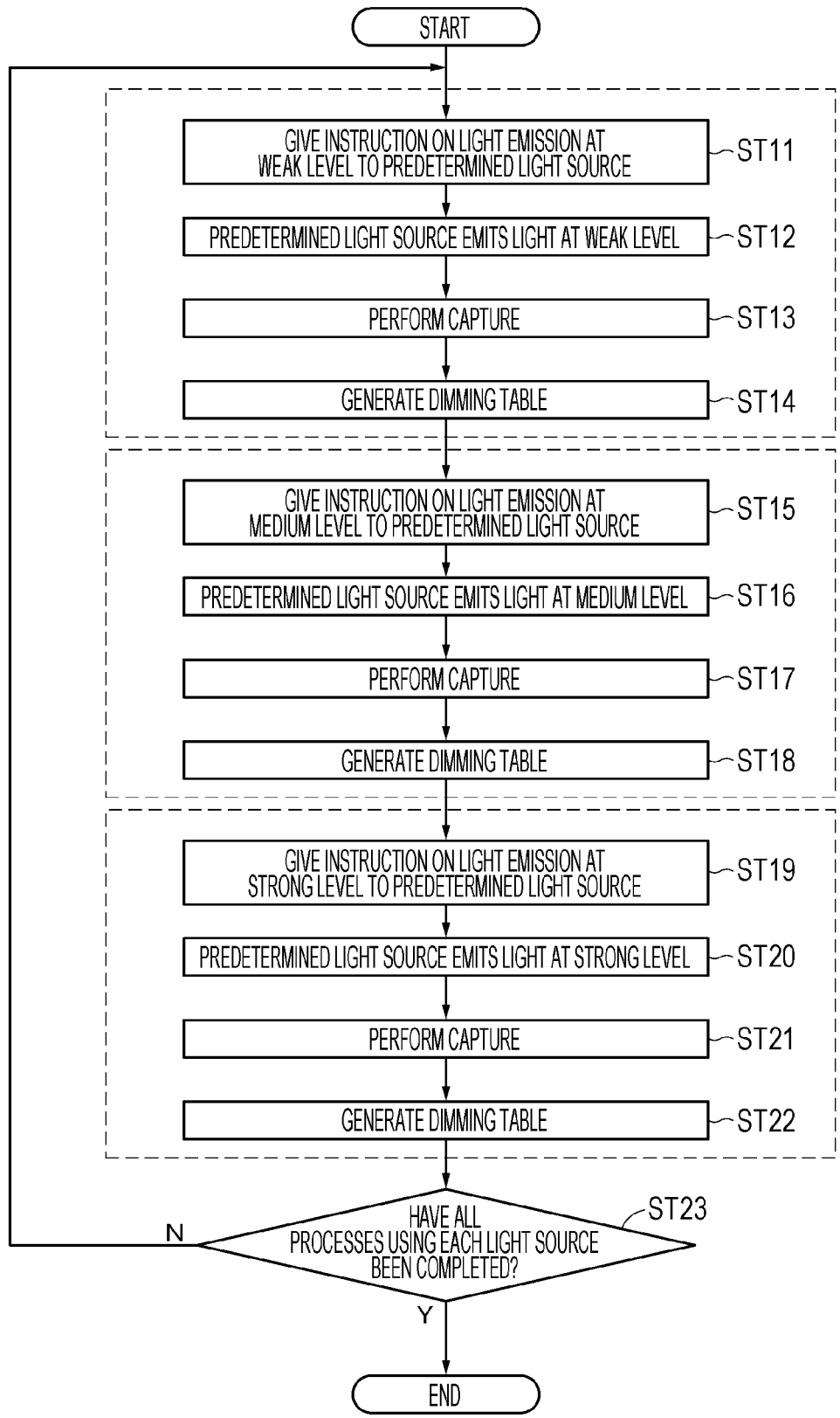

| LIGHT SOURCE | LIGHT EMISSION INTENSITY | POSITION INFORMATION | LUMINANCE LEVEL OF EACH PIXEL |
|---|---|---|---|
| 5A | WEAK | AA | · · · · · · · · · · · |
| 5A | MEDIUM | AA | · · · · · · · · · · · |
| 5A | STRONG | AA | · · · · · · · · · · · |
| 5A | WEAK | BB | · · · · · · · · · · · |
| 5A | MEDIUM | BB | · · · · · · · · · · · |
| 5A | STRONG | BB | · · · · · · · · · · · |
| 5B | WEAK | AA | · · · · · · · · · · · |
| ⋮ | ⋮ | ⋮ | ⋮ |

TA2

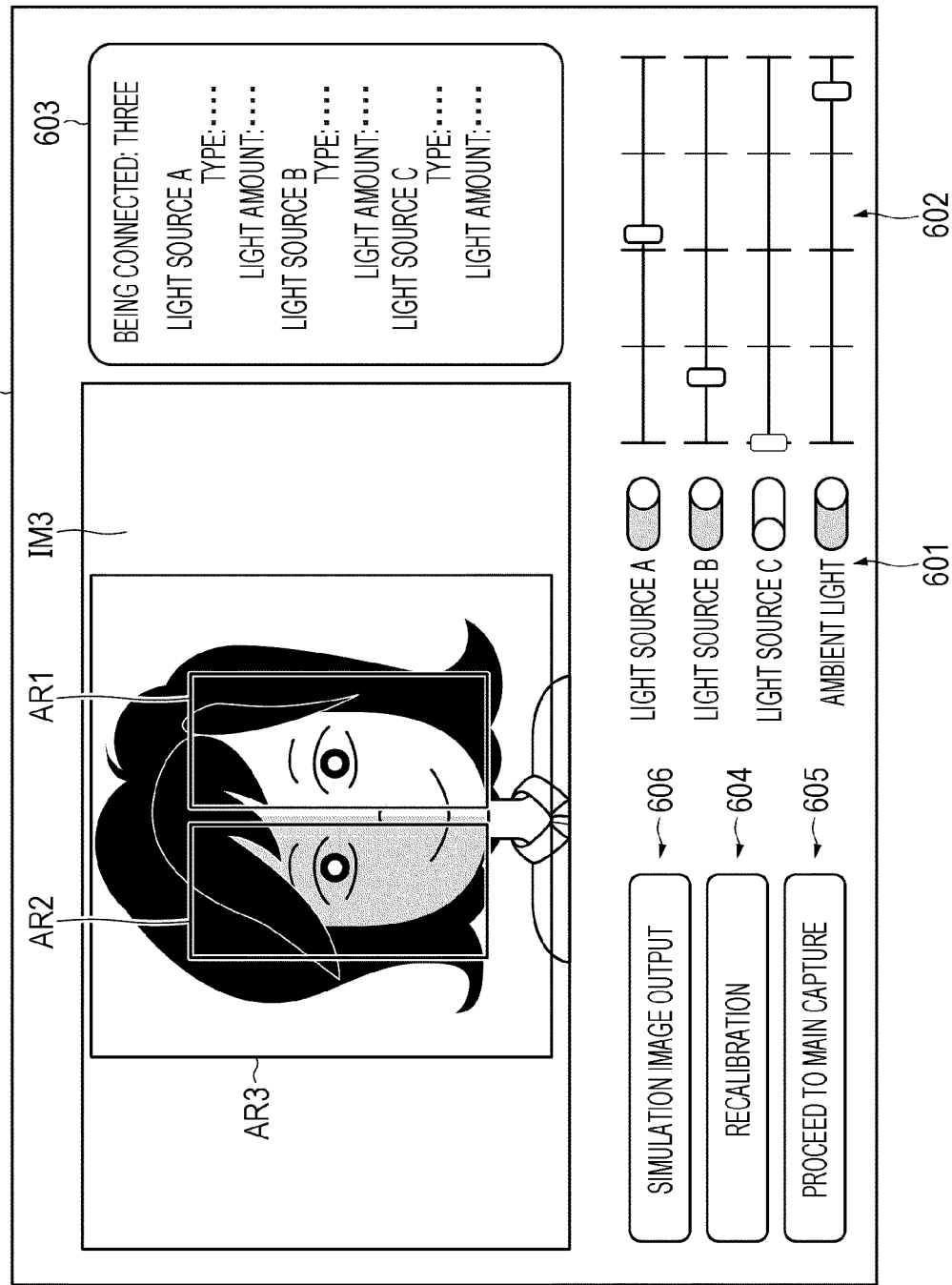

INFORMATION PROCESSING APPARATUS, INFORMATION PROCESSING METHOD, PROGRAM, AND LIGHTING SYSTEM

TECHNICAL FIELD

The present disclosure relates to an information processing apparatus, an information processing method, a program, and a lighting system.

BACKGROUND ART

A capture technique of capturing an image in a state of irradiating (lighting) an object with light from a plurality of light sources is known. Lighting is widely used in production sites for photographs and videos (for example, movies) as a technique of impressively expressing an object, such as giving a stereoscopic effect to the object. However, to obtain a desired lighting effect, repetition of adjustment for the plurality of light sources and test capture after the adjustment are necessary, and general lighting systems have a problem of requiring a lot of personnel and time. In view of such a situation, there has been proposed a capture simulation device that can set lighting conditions on a computer and check an image obtained under the set lighting conditions on the computer (see, for example, Patent Document 1 below).

CITATION LIST

Patent Document

Patent Document 1: Japanese Patent Application Laid-Open No. 2005-301785

SUMMARY OF THE INVENTION

Problems to be Solved by the Invention

However, even if the lighting result can be simulated on the computer as in the technology described in Patent Document 1, there is a problem that the lighting conditions need to be set through trial and error to obtain a desired lighting effect.

An object of the present disclosure is to provide an information processing apparatus, an information processing method, a program, and a lighting system capable of easily performing settings of a light emitting unit (light source) for obtaining a desired lighting effect.

Solutions to Problems

The present disclosure is, for example,
an information processing apparatus including:
a control unit configured to determine a setting of a light emitting unit according to concept data indicating a characteristic of a desired image and a light emission result of the light emitting unit, in which
the control unit controls the determined setting to maintain the concept data in a case where change in an object has occurred.

The present disclosure is, for example,
an information processing method including:
determining a setting of a light emitting unit according to concept data indicating a characteristic of a desired image and a light emission result of the light emitting unit; and
controlling the determined setting to maintain the concept data in a case where change in an object has occurred.

The present disclosure is, for example,
a program for causing a computer to execute processing of:
determining a setting of a light emitting unit according to concept data indicating a characteristic of a desired image and a light emission result of the light emitting unit; and
controlling the determined setting to maintain the concept data in a case where change in an object has occurred.

The present disclosure is, for example,
a lighting system including:
an information processing apparatus; and
a light emitting unit,
the information processing apparatus including
a control unit configured to determine a setting of a light emitting unit according to concept data indicating a characteristic of a desired image and a light emission result of the light emitting unit, and control the determined setting to maintain the concept data in a case where change in an object has occurred, and
an output unit configured to output the setting to the light emitting unit,
the light emitting unit including
a light emission control unit configured to control light emission based on the setting output from the information processing apparatus.

Effects of the Invention

According to at least embodiments of the present disclosure, a light emitting unit for obtaining a desired lighting effect can be easily set. Note that effects described here are not necessarily limited, and any of effects described in the present disclosure may be exhibited. Furthermore, content of the present disclosure is not construed in a limited manner by the exemplified effects.

BRIEF DESCRIPTION OF DRAWINGS

FIG. 3 is a block diagram illustrating a configuration example of a tablet computer according to the first embodiment.

FIGS. 4A to 4C are block diagrams illustrating configuration examples of light sources according to the first embodiment.

FIG. 5 is a diagram for describing calibration processing according to the first embodiment.

FIG. 6 is a diagram for describing an example of a dimming table according to the first embodiment.

FIG. 7 is a flowchart illustrating an example of a processing flow of the calibration processing according to the first embodiment.

FIG. 17 is a diagram for describing modifications.

MODE FOR CARRYING OUT THE INVENTION

Hereinafter, embodiments and the like of the present disclosure will be described with reference to the drawings. Note that the description will be given in the following order.
<1. First Embodiment>
<2. Second Embodiment>
<3. Modification>

Embodiments and the like to be described below are favorable specific examples of the present disclosure, and content of the present disclosure is not limited to these embodiments and the like.

1. First Embodiment

First, a first embodiment according to the present disclosure will be described. The first embodiment is an embodiment for automatically performing a setting of lighting for obtaining a lighting effect desired by a user when the user captures a still image. The setting of lighting means a setting for a light source (light), and in the embodiment, a setting regarding light emission intensity of the light source will be described as an example. Note that the setting for the light source is not limited to the light emission intensity of the light source. For example, the setting may be related to at least one of the above-described light emission intensity, a color temperature of light emitted from the light source, softness/hardness of the light, an irradiation range of the light, or an irradiation direction of the light. The setting may be a specific value (for example, a specific value in units of Kelvin (K) in the case of the color temperature) or may be a value (flag) corresponding to a level of light emission intensity (for example, strong, medium, or weak of the light emission intensity) or the irradiation direction of light (for example, slightly rightward, leftward, or the like with respect to a reference direction).

[Configuration Example of Lighting System]

Figure 1:
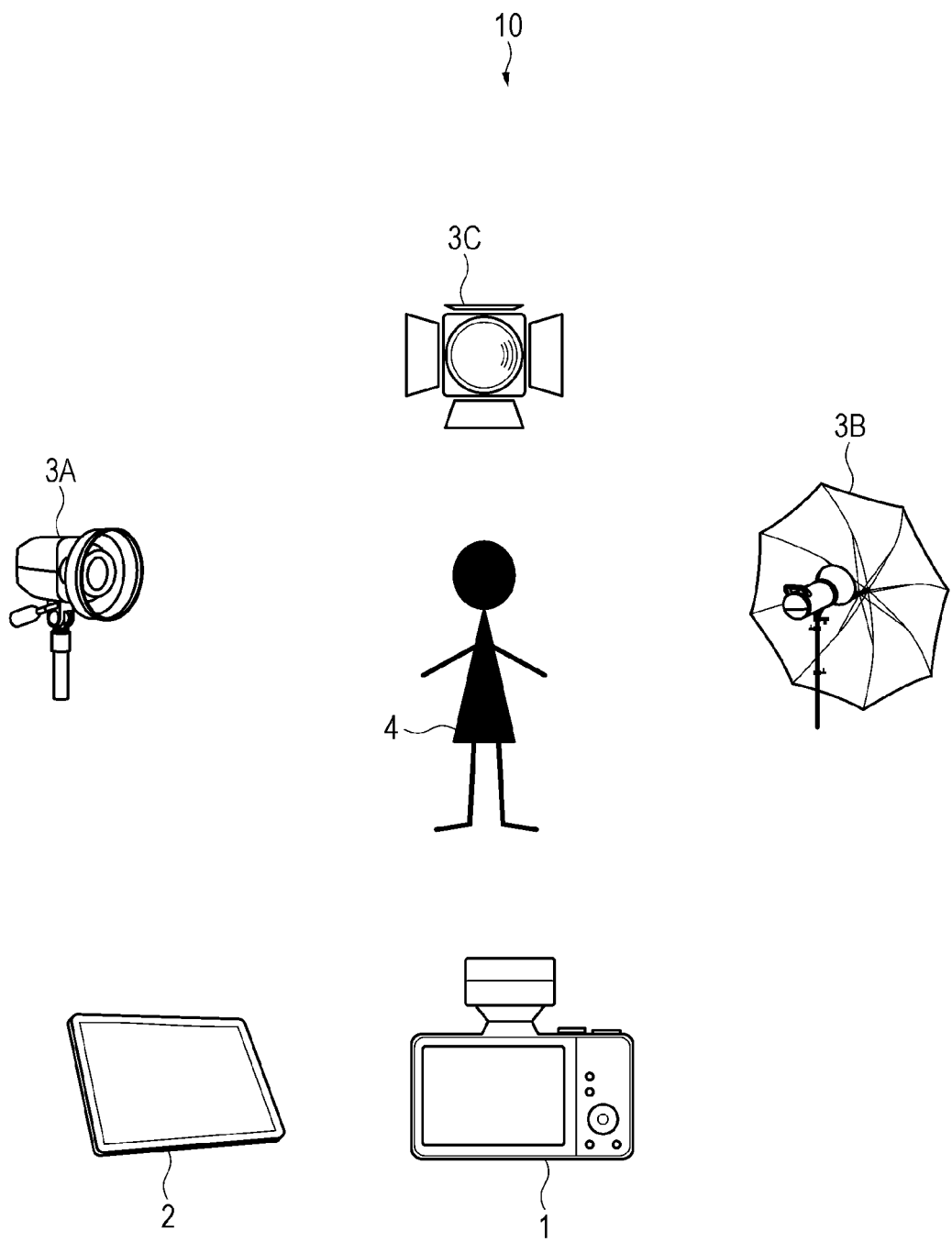
FIG. 1 is a diagram illustrating a configuration example of a lighting system according to a first embodiment.

FIG. 1 illustrates a configuration example of a lighting system (lighting system 10) according to the first embodiment of the present disclosure. The lighting system 10 includes an imaging device 1, a tablet computer (hereinafter referred to as a tablet computer 2) that is an example of an information processing apparatus, and a plurality of light sources (light emitting units). The lighting system 10 according to the present embodiment includes three light sources (light sources 3A, 3B, and 3C) corresponding to an illumination technique called three-lamp illumination. For example, the light source 3A is called fill light, the light source 3B is called key light, and the light source 3C is called backlight. An object 4 is captured using the imaging device 1 in a state where the light sources 3A to 3C emit light. In the present embodiment, the light source 3A and the light source 3B instantaneously emit light (flash light emission) in synchronization with capture. Furthermore, the light source 3C does not instantaneously emit light in synchronization with capture although emitting light at the time of capture, and is steady light that steadily emits light. The object 4 is schematically illustrated as a person in FIG. 1. However, the object 4 is not limited to one person, and may be a plurality of persons, other creatures such as pets, art works, or the like.

Communication can be performed between the imaging device 1 and the tablet computer 2 and between the tablet computer 2 and the light sources 3A to 3C. For example, wireless communication based on WiFi (registered trademark) is performed between the devices. Wireless communication based on a communication standard other than WiFi (registered trademark) may be performed, communication using infrared rays may be performed, or wired communication may be performed. For example, these devices communicate with each other after performing known pairing processing for enabling these devices to recognize each other and become able to communicate with each other.

[Imaging Device]

(Configuration Example of Imaging Device)

Figure 2:
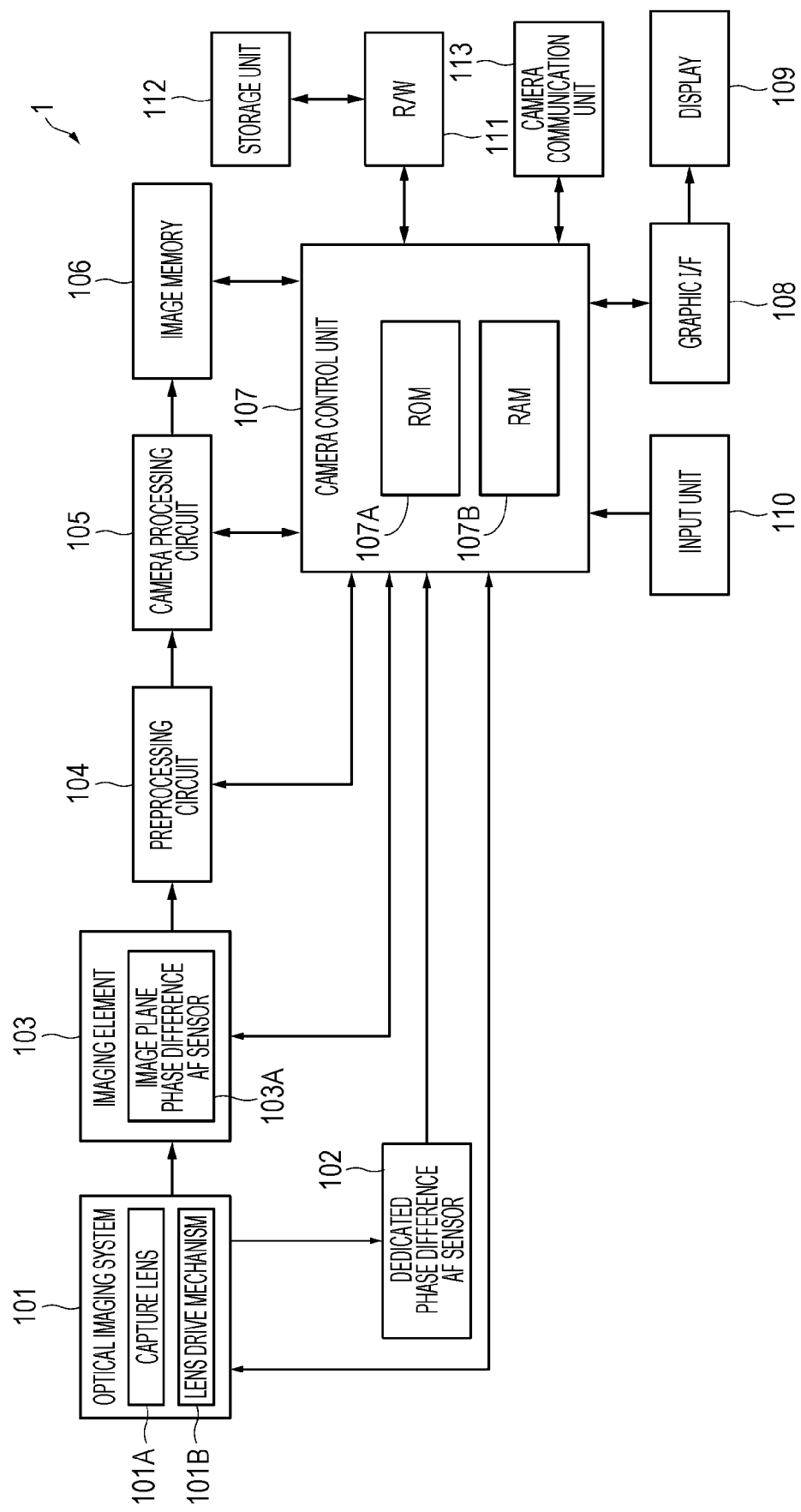
FIG. 2 is a block diagram illustrating a configuration example of an imaging device according to the first embodiment.

Next, configuration examples of the devices constituting the lighting system 10 will be described. First, a configuration example of the imaging device 1 will be described. FIG. 2 illustrates a configuration example of the imaging device 1. The imaging device 1 includes, for example, an optical imaging system 101, a dedicated phase difference auto focus (AF) sensor 102, an imaging element 103, a preprocessing circuit 104, a camera processing circuit 105, an image memory 106, and a camera control unit 107, a graphic interface (I/F) 108, a display 109, an input unit 110, a reader/writer (R/W) 111, a storage unit 112, and a camera communication unit 113.

The optical imaging system 101 includes a capture lens 101A (including a focus lens, a zoom lens, and the like) for condensing light from an object on the imaging element 103, a lens drive mechanism 101B that performs focus adjustment by moving the focus lens, and a shutter mechanism, an iris mechanism, and the like. These lens and mechanisms are driven on the basis of a control signal from the camera control unit 107. The lens drive mechanism 101B realizes an AF operation by moving the capture lens 101A along an optical axis direction in accordance with the control signal supplied from the camera control unit 107. An optical image of the object obtained through the optical imaging system 101 is formed on the imaging element 103 as an imaging device.

The dedicated phase difference AF sensor 102 is, for example, a phase difference detection-type auto focus dedicated sensor. Object light condensed by the capture lens 101A is reflected by a semi-transmissive mirror or the like to enter the dedicated phase difference AF sensor 102. A focus detection signal detected by the dedicated phase difference AF sensor 102 is supplied to the camera control unit 107.

The imaging element 103 is a charge coupled device (CCD), a complementary metal oxide semiconductor (CMOS), or the like. The imaging element 103 photoelectrically converts the object light incident via the capture lens 101A into a charge amount, and generates an image. The imaging element 103 has a normal imaging pixel and a phase difference detection pixel. An image plane phase difference AF sensor 103A is an autofocus sensor including a plurality of phase difference detection pixels. The focus detection signal detected by the image plane phase difference AF sensor 103A is supplied to the camera control unit 107.

The preprocessing circuit 104 performs sample hold for an imaging signal output from the imaging element 103 to maintain a favorable signal/noise (S/N) ratio by correlated double sampling (CDS) processing. Moreover, the preprocessing circuit 104 controls a gain by auto gain control (AGC) processing and performs analog/digital (A/D) conversion, and outputs a digital image signal.

The camera processing circuit 105 applies signal processing to the image signal from the preprocessing circuit 104, such as white balance adjustment processing, color correction processing, gamma correction processing, Y/C conversion processing, and auto exposure (AE) processing.

The image memory 106 is a volatile memory, for example, a buffer memory configured by a dynamic random access memory (DRAM), and temporarily stores image data to which the predetermined processing has been applied by the preprocessing circuit 104 and the camera processing circuit 105.

The camera control unit 107 is configured by, for example, a central processing unit (CPU) and includes a read only memory (ROM) 107A and a random access memory (RAM) 107B. The ROM 107A stores a program that is read and executed by the CPU and the like. The RAM 107B is used as a work memory for the CPU. The CPU controls the entire imaging device 1 by executing various types of processing in accordance with the program stored in the ROM 107A and issuing commands. For example, the CPU performs control regarding the above-described AF. Although details will be described below, the camera control unit 107 controls each unit of the imaging device 1 so that capture is performed in a state where each of the plurality of light sources 3A to 3C emits light on the basis of the corresponding setting.

The graphic I/F 108 generates an image signal to be displayed on the display 109 from the image signal supplied from the camera control unit 107 and supplies the image signal to the display 109 to display an image. The display 109 displays a through image being captured, an image recorded in the storage unit 112, or the like.

The display 109 is configured by a liquid crystal display (LCD), an organic electroluminescence (EL) display, or the like.

The input unit 110 includes, for example, a power button for switching on/off of power, a release button for giving an instruction on start of recording of a captured image, an operator for zoom adjustment, a touch screen integrally configured with the display 109, and the like. When an input is made to the input unit 110, a control signal corresponding to the input is generated and output to the camera control unit 107. Then, the camera control unit 107 performs arithmetic processing and control corresponding to the control signal.

The R/W 111 is an interface to which the storage unit 112 that records image data generated by imaging is connected. The R/W 111 writes data supplied from the camera control unit 107 to the storage unit 112, and outputs the data read from the storage unit 112 to the camera control unit 107. The storage unit 112 is, for example, a hard disk, a memory stick (registered trademark of Sony Corporation), an SD memory card, a universal serial bus (USB) memory, or the like. An image is stored in a compressed state on the basis of a standard of joint photographic experts group (JPEG) or the like. Furthermore, exchangeable image file format (EXIF) data including information regarding the stored image and additional information such as capture date and time is also stored in association with the image. The storage unit 112 may be built in the imaging device 1, may be attachable/detachable to/from the imaging device 1, or may be both.

The camera communication unit 113 is a configuration for the imaging device 1 to communicate with other devices (for example, the tablet computer 2), and has functions necessary for communication such as an antenna and a modulation/demodulation function. For example, the image data of the image captured by the imaging device 1 is transmitted from the imaging device 1 to the tablet computer 2 by the camera communication unit 113.

(Basic Operation Example of Imaging Device)

Here, a basic operation in the above-described imaging device 1 will be described. Before capture of an image, signals received and photoelectrically converted by the imaging element 103 are sequentially supplied to the preprocessing circuit 104. The preprocessing circuit 104 applies CDS processing, AGC processing, and the like to the input signal, and further converts the input signal into an image signal.

The camera processing circuit 105 performs image quality correction processing for the image signal supplied from the preprocessing circuit 104, and supplies the image signal to the graphic I/F 108 via the camera control unit 107 as a through image signal. Thereby, the through image is displayed on the display 109. The user views the through image displayed on the display 109 and can adjust an angle of view.

In this state, when the shutter button of the input unit 110 is pressed, the camera control unit 107 outputs the control signal to the optical imaging system 101 to operate shutters constituting the optical imaging system 101. Thereby, the imaging element 103 outputs an image signal for one frame.

The camera processing circuit 105 applies image quality correction processing to the image signal for one frame supplied from the imaging element 103 via the preprocessing circuit 104, and supplies the processed image signal to the camera control unit 107. The camera control unit 107 compresses and encodes the input image signal, and supplies the generated coded data to the R/W 111. Thereby, a data file of a captured still image is stored in the storage unit 112 via the R/W 111. Note that, in capturing a moving image, the above-described processing is performed in real time in response to a moving image capture instruction. A still image can be captured at the time of capturing a moving image by pressing the shutter button at the time of capturing the moving image.

Meanwhile, in a case of reproducing an image file stored in the storage unit 112, the camera control unit 107 reads a selected still image file from the storage unit 112 via the R/W 111 in response to an operation input from the input unit 110. Decompression decoding processing is applied to the read image file. Then, the decoded image signal is supplied to the graphic I/F 108 via the camera control unit 107. Thereby, a still image or a moving image stored in the storage unit 112 is displayed on the display 109.

[Configuration Example of Tablet Computer]

FIG. 3 illustrates a configuration example of a tablet computer 2. The tablet computer 2 has a portable size, and includes, for example, a control unit 201, a communication unit (hereinafter referred to as a tablet communication unit) 202 included in the tablet computer, a display unit 203, an input unit 204, an R/W 205, and a storage unit 206.

The control unit 201 includes a CPU and the like, and includes a ROM and a RAM (not illustrated). The ROM stores a program that is read and executed by the CPU and the like. The RAM is used as a work memory for the CPU. Furthermore, the control unit 201 includes a dimming table generation unit 201A and a dimming information generation unit 201B as functions. The control unit 201 determines the settings of the light sources 3A to 3C according to concept data indicating an image characteristic desired by the user and light emission results of the light sources 3A to 3C.

The tablet communication unit 202 as an example of an output unit is a configuration for the tablet computer 2 to communicate with other devices (for example, the imaging device 1 and the light sources 3A to 3C), and has functions necessary for communication such as an antenna and a modulation/demodulation function. For example, the image data of the image transmitted from the imaging device 1 is received by the tablet communication unit 202, and the received image data is supplied to the control unit 201. Furthermore, the setting for each of the light sources 3A to 3C is transmitted from the tablet communication unit 202 to the corresponding light source. Note that the tablet communication unit 202 according to the present embodiment also has a function to be connected to a network such as the Internet.

The display unit 203 is configured by a liquid crystal display, an organic EL display, or the like. The display unit 203 displays images and videos acquired via the Internet, television broadcasts, game screens, menu screens, and the like. Furthermore, the display unit 203 displays a reference image that is referred to when the user accepts an input for generating concept data to be described below. Note that the display unit 203 according to the present embodiment is configured as a touch screen, and is configured to accept various inputs. That is, the display unit 203 also functions as the input unit 204.

The input unit 204 is, for example, a physical button such as a pushable button or a slide button, a touch screen, or the like, and is a collective term for configurations that accept user operation inputs. When an input is made to the input unit 204, a control signal corresponding to the input is generated and output to the control unit 201. Then, the control unit 201 performs arithmetic processing and control corresponding to the control signal. The input unit 204 is also used for accepting an input for generating the concept data to be described below.

The R/W 205 writes data to the storage unit 206 and reads data from the storage unit 206. The storage unit 206 is, for example, a hard disk, a memory stick (registered trademark of Sony Corporation), an SD memory card, a USB memory, or the like. The storage unit 206 may be built in the tablet computer 2, may be attachable/detachable to/from the tablet computer 2, or may be both.

Note that the tablet computer 2 may have a configuration other than the above-described configuration. For example, the tablet computer 2 may include a speaker device or the like. An operation example of the tablet computer 2 will be described below.

[Configuration Example of Light Source]

FIG. 4 illustrates configuration examples of the light sources, and FIG. 4A illustrates a configuration example of the light source 3A, FIG. 4B illustrates a configuration example of the light source 3B, and FIG. 4C illustrates a configuration example of the light source 3C.

As illustrated in FIG. 4A, the light source 3A includes, for example, a light emitting unit (light emitting body) 301A, a dimming control unit 302A, and a light source communication unit 303A. The light emitting unit 301A is, for example, a flash light source such as a strobe, and emits light in synchronization with capture by the imaging device 1. The dimming control unit 302A controls the light emission intensity, light emission timing, and the like of the light emitting unit 301A on the basis of dimming information received by the light source communication unit 303A. The light source communication unit 303A is used for the light source 3A to communicate with other devices (for example, the imaging device 1 and the tablet computer 2).

As illustrated in FIG. 4B, the light source 3B includes, for example, a light emitting unit (light emitting body) 301B, a dimming control unit 302B, and a light source communication unit 303B. The light emitting unit 301B is, for example, a flash light source such as a strobe, and emits light in synchronization with capture by the imaging device 1. The dimming control unit 302B controls the light emission intensity, light emission timing, and the like of the light emitting unit 301B on the basis of dimming information received by the light source communication unit 303B. The light source communication unit 303B is used for the light source 3B to communicate with other devices (for example, the imaging device 1 and the tablet computer 2).

As illustrated in FIG. 4C, the light source 3C includes, for example, a light emitting unit (light emitting body) 301C, a dimming control unit 302C, and a light source communication unit 303C. The light emitting unit 301C is, for example, a fluorescent lamp or a light emitting diode (LED). The dimming control unit 302C controls the light emission intensity of the light emitting unit 301C on the basis of dimming information received by the light source communication unit 303C. The light source communication unit 303C is used for the light source 3C to communicate with other devices (for example, the imaging device 1 and the tablet computer 2). Note that it goes without saying that the configurations of the light sources 3A to 3C may be different.

As an example, each of the light sources 3A to 3C is configured to emit light at three levels of light emission intensity (weak, medium, and strong). Of course, the light sources 3A to 3C may emit light at two levels of light emission intensity, or at multi levels such as four or more levels of light emission intensity. Furthermore, for example, the light emission intensity "weak" of the light source 3A and the light emission intensity "weak" of the light source 3B may be the same light emission intensity or different levels of light emission intensity.

[Processing Performed in First Embodiment]

Next, processing performed in the first embodiment will be described, including an operation of each device. In the present embodiment, for convenience of description, the processing performed in the first embodiment is divided into three types of processing: "calibration processing", "concept data generation processing", and "lighting setting and capture processing", and each type of the processing will be described in turn. Note that the three types of processing do not need to be performed in the order described below, and the order of the processing may be changed within a range where no technical contradiction occurs, the processing may be performed in parallel, or each type of the processing may be continuously performed. For example, the calibration processing may be performed after the concept data generation processing, or the calibration processing and the concept data generation processing may be performed in parallel.

(Calibration Processing)

The calibration processing is processing of measuring in advance an influence of light by light emission on the image of the object in a case where the light emission result of each light source, specifically, each light source emits light in a different pattern on a one-by-one basis, and obtaining a table that is a measurement result (hereinafter the table is referred to as a dimming table as appropriate).

The calibration processing will be schematically described with reference to FIG. 5. First, the light source 3A emits light in different light emission patterns. In the present example, the light source 3A emits light at different levels of light emission intensity. However, the different light emission patterns may be different color temperatures or the like. This also similarly applies to the other light sources. Note that the light sources 3B and 3C remain off without emitting light.

The light source 3A emits light with the light emission intensity "weak" in synchronization with capture, and capture is performed. Next, the light source 3A emits light with the light emission intensity "medium" in synchronization with capture, and capture is performed. Next, the light source 3A emits light with the light emission intensity "strong" in synchronization with capture, and capture is performed. Images obtained by the captures are temporarily stored in, for example, the image memory 106 of the imaging device 1.

Next, the light source 3B emits light at different levels of light emission intensity. Note that the light sources 3A and 3C remain off without emitting light. The light source 3B emits light with the light emission intensity "weak" in synchronization with capture, and capture is performed. Next, the light source 3B emits light with the light emission intensity "medium" in synchronization with capture, and capture is performed. Next, the light source 3B emits light with the light emission intensity "strong" in synchronization with capture, and capture is performed. Images obtained by the captures are temporarily stored in, for example, the image memory 106 of the imaging device 1.

Next, the light source 3C emits light at different levels of light emission intensity. Note that the light sources 3A and 3B remain off without emitting light. Capture is performed in a state where the light source 3C emits light with the light emission intensity "weak". Next, capture is performed in a state where the light source 3C emits light with the light emission intensity "medium". Capture is performed in a state where the light source 3C emits light with the light emission intensity "strong". Images obtained by the captures are temporarily stored in, for example, the image memory 106 of the imaging device 1.

Image data of nine images obtained by the captures is transmitted from the imaging device 1 to the tablet computer 2. That is, the image data is transmitted from the camera communication unit 113, and the image data is received by the tablet communication unit 202. The received image data is supplied from the tablet communication unit 202 to the control unit 201. The dimming table generation unit 201A of the control unit 201 analyzes and acquires image information for each of the nine images.

The image information is spatial sensor information corresponding to the light emission pattern of each light source. In the present embodiment, a luminance level for each pixel constituting the image is used. Note that, to reduce the amount of information, a luminance level in a unit of a block having an arbitrary size instead of for each pixel, or data compressed by another appropriate method may be used as the image information. Furthermore, the processing of analyzing and acquiring the image information may be performed by the imaging device 1, and only the image information may be transmitted from the imaging device 1 to the tablet computer 2.

The dimming table generation unit 201A, which has acquired the image information, generates a dimming table corresponding to the light emission result of each light source. FIG. 6 illustrates an example of a dimming table (dimming table TA1) according to the first embodiment. The dimming table TA1 includes, for example, the type of light source (information such as an identifier that can identify the light source), the light emission intensity, and the image information (in the present embodiment, the luminance level of each pixel of the image captured with the light emission intensity) that are associated with one another.

Note that the dimming table TA1 generated by the dimming table generation unit 201A may be written and stored in the storage unit 206 via the R/W 205. Thereby, for example, when the same or similar object is captured in the same studio, the calibration processing can be omitted by using the dimming table TA1 stored in the storage unit 206. The dimming table TA1 may be stored in a memory (for example, a memory on the cloud) that is not the storage unit 206, or may be transmitted and distributed to other devices by communication.

Furthermore, for example, in a case where change in the image information with respect to change in the light emission intensity is known, image information corresponding to light emission intensity different from predetermined light emission intensity may be generated using image information corresponding to the predetermined light emission intensity in order to simplify the calibration processing. For example, regarding the light source 3A, the dimming table generation unit 201A may predict and generate the image information corresponding to the light emission intensity "medium" and to the light emission intensity "strong" on the basis of the image information in the case of emitting light with the light emission intensity "weak". Thereby, the number of captures can be reduced, and the calibration processing can be simplified.

Note that the object (object to be captured) in the calibration processing is favorably the same as but may be different from the object in the "lighting setting and capture processing". For example, the object in the calibration processing may be an object similar to the object in the "lighting setting and capture processing" (a person with a similar face size or a similar skin color in a case where the object is a person).

FIG. 7 is a flowchart illustrating an example of a processing flow of the calibration processing. In step ST11, an instruction to emit light with the light emission intensity "weak" is given to a predetermined light source (light source 3A, for example). This instruction is made using the input unit 204 of the tablet computer 2, for example. Note that, since the light source 3A emits light in synchronization with capture, synchronization information such as timing to synchronize light emission and capture is transmitted from the tablet computer 2 to the light source 3A and the imaging device 1. Then, the processing proceeds to steps ST12 and ST13.

In steps ST12 and ST13, capture is performed at the timing indicated by the synchronization information, and the light source 3A emits light with the light emission intensity "weak" in synchronization with the capture. Specifically, the camera control unit 107 of the imaging device 1 controls each unit of the imaging device 1 so that capture is performed at the timing indicated by the synchronization information. Furthermore, the dimming control unit 302A of the light source 3A causes the light emitting unit 301A to emit light with the light emission intensity "weak" at the timing indicated by the synchronization information. Then, the processing proceeds to step ST14.

In step ST14, an image obtained by capture in step ST13 is transmitted from the imaging device 1 to the tablet computer 2. Then, the dimming table generation unit 201A of the tablet computer 2 generates one element of the dimming table TA1 by analyzing the image information of the image in the case where the light source 3A emits light with the light emission intensity "weak". Then, the processing proceeds to step ST15.

In step ST15, an instruction to emit light with the light emission intensity "medium" is given to the light source 3A. This instruction is also given using the input unit 204 of the tablet computer 2, for example. Note that, as described above, since the light source 3A emits light in synchronization with capture, the synchronization information such as timing to synchronize light emission and capture is transmitted from the tablet computer 2 to the light source 3A and the imaging device 1. Then, the processing proceeds to steps ST16 and ST17.

In steps ST16 and ST17, capture is performed at the timing indicated by the synchronization information, and the light source 3A emits light with the light emission intensity "medium" in synchronization with the capture. Specifically, the camera control unit 107 of the imaging device 1 controls each unit of the imaging device 1 so that capture is performed at the timing indicated by the synchronization information. Furthermore, the dimming control unit 302A of the light source 3A causes the light emitting unit 301A to emit light with the light emission intensity "medium" at the timing indicated by the synchronization information. Then, the processing proceeds to step ST18.

In step ST18, an image obtained by capture in step ST16 is transmitted from the imaging device 1 to the tablet computer 2. Then, the dimming table generation unit 201A of the tablet computer 2 generates one element of the dimming table TA1 by analyzing the image information of the image in the case where the light source 3A emits light with the light emission intensity "medium". Then, the processing proceeds to step ST19.

In step ST19, an instruction to emit light with the light emission intensity "strong" is given to the light source 3A. This instruction is also given using the input unit 204 of the tablet computer 2, for example. Note that, as described above, since the light source 3A emits light in synchronization with capture, the synchronization information such as timing to synchronize light emission and capture is transmitted from the tablet computer 2 to the light source 3A and the imaging device 1. Then, the processing proceeds to steps ST20 and ST21.

In steps ST20 and ST21, capture is performed at the timing indicated by the synchronization information, and the light source 3A emits light with the light emission intensity "strong" in synchronization with the capture. Specifically, the camera control unit 107 of the imaging device 1 controls each unit of the imaging device 1 so that capture is performed at the timing indicated by the synchronization information. Furthermore, the dimming control unit 302A of the light source 3A causes the light emitting unit 301A to emit light with the light emission intensity "strong" at the timing indicated by the synchronization information. Then, the processing proceeds to step ST22.

In step ST22, an image obtained by capture in step ST21 is transmitted from the imaging device 1 to the tablet computer 2. Then, the dimming table generation unit 201A of the tablet computer 2 generates one element of the dimming table TA1 by analyzing the image information of the image in the case where the light source 3A emits light with the light emission intensity "strong". Then, the processing proceeds to step ST23.

In step ST23, whether or not all pieces of the processing using the light sources have been completed is determined. In the present example, processing using the light source 3B and the light source 3C has not been completed, the processing returns to step ST11. Then, similarly to the above-described processing, the light source 3B is caused to emit light at different levels of light emission intensity, and one element of the dimming table TA1 is generated on the basis of the image information of the image obtained at that time. Similar processing is performed for the light source 3C. Note that, since the light source 3C is not flash light emission, capture may be performed by operating the input unit 110 of the imaging device 1 in a state of causing the light source 3C to emit light with predetermined light emission intensity. That is, the synchronization information does not need to be transmitted to the imaging device 1 and the light source 3C.

In step ST23, in a case where all pieces of the processing using the light sources have been completed, the dimming table TA1 illustrated in FIG. 6 is obtained on the basis of the elements of the dimming table obtained in the respective pieces of processing in steps ST14, ST18, and ST22. Then, the processing ends.

(Concept Data Generation Processing)

Next, the concept data generation processing will be described. The concept data is data indicating an image characteristic desired (by the user), and more specifically, data indicating brightness for each area of the object.

Figure 8:
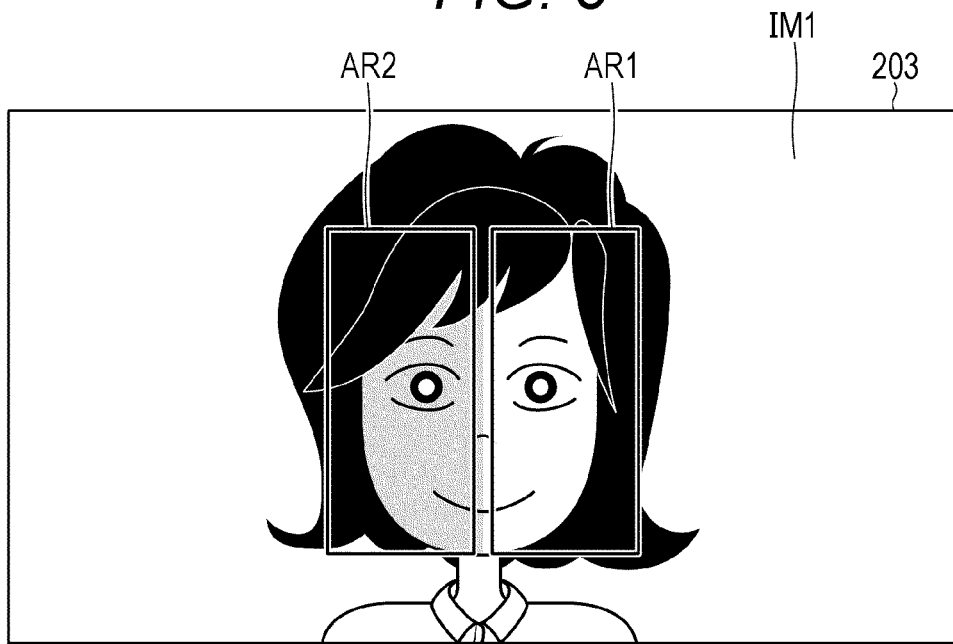
FIG. 8 is a diagram for describing an example of a reference image and the like according to the first embodiment.

The concept data is specified using the input unit 204 of the tablet computer 2, for example. The display unit 203 displays the reference image that is referred to when an input to the input unit 204 is accepted. For example, as illustrated in FIG. 8, a reference image IM1 is displayed on the display unit 203. The user performs an operation based on his/her concept for the input unit 204 while referring to the reference image IM1.

As the reference image IM1, for example, one of the nine images obtained by the above-described calibration processing can be used. This eliminates the need to capture the reference image IM1 itself. Furthermore, the reference image IM1 may be an image obtained by capturing the object captured by the "lighting setting and capture processing". The capture at this time may be performed in a state where only ambient light (indoor room light not related to capture) is emitted in a state where the light sources 3A to 3C do not emit light. Moreover, the reference image IM1 may be a template image selected according to a predetermined result of known person recognition or face recognition with respect to the object captured in the "lighting setting and capture processing". In this case, the predetermined processing is performed by the control unit 201, for example. Furthermore, the template image may be an image obtained by reading the image stored in the storage unit 206 by the R/W 205, or may be an image acquired from the Internet or the like.

Figure 9:
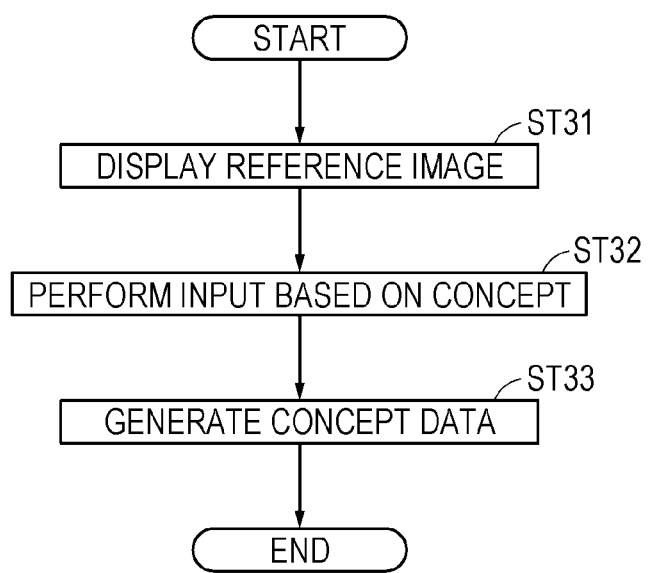
FIG. 9 is a flowchart illustrating an example of a processing flow of concept data generation processing according to the first embodiment.

FIG. 9 is a flowchart illustrating an example of a processing flow of the concept data generation processing. A specific example of the concept data generation processing will be described with reference to FIGS. 8 and 9. The concept data generation processing is started when, for example, a predetermined button of the input unit 204 is pressed or touched. In step ST31, the reference image IM1 is displayed on the display unit 203. Then, the processing proceeds to step ST32.

In step ST32, the user performs an input based on the concept while referring to the reference image IM1. For example, as illustrated in FIG. 8, two areas AR1 and AR2 are set for the object. For example, brightness is specified such that the brightness of the area AR1 becomes appropriate exposure and the brightness of the area AR2 becomes ⅔ (about 66%) of appropriate exposure. The setting of the areas and the specification of the brightness are performed using the input unit 204. In the present embodiment, the configuration (for example, the brightness) corresponding to the input is reflected in the reference image IM1 every time input is performed by the input unit 204. For example, as illustrated in FIG. 8, the brightness of the area AR2 becomes slightly dark. Note that settings of the brightness of a background and the like may be performed although not illustrated. When the user finishes the specification of the brightness or the like, the user presses or touches a completion button or the like to terminate the input based on the concept. Then, the processing proceeds to step ST33.

In step ST33, concept data is generated on the basis of the input made in step ST32. The concept data is generated by the control unit 201, for example. As described above, the concept data is data indicating that, for example, a right half of the face is properly exposed and a left half of the face is exposed by ⅔ of the appropriate exposure. Then, the processing ends.

Note that the concept data may be stored in the storage unit 206. Then, when capturing an object with a similar face size, skin color, or the like, the previous concept data may be read from the storage unit 206 and used. Furthermore, the concept data may be distributed by communication or the like via the tablet communication unit 202. For example, the concept data of a well-known photographer has a proprietary value in itself. Therefore, by charging for the distribution of the concept data, a new business model using the concept data as a key becomes able to be provided.

(Lighting Setting and Capture Processing)

Figure 10:
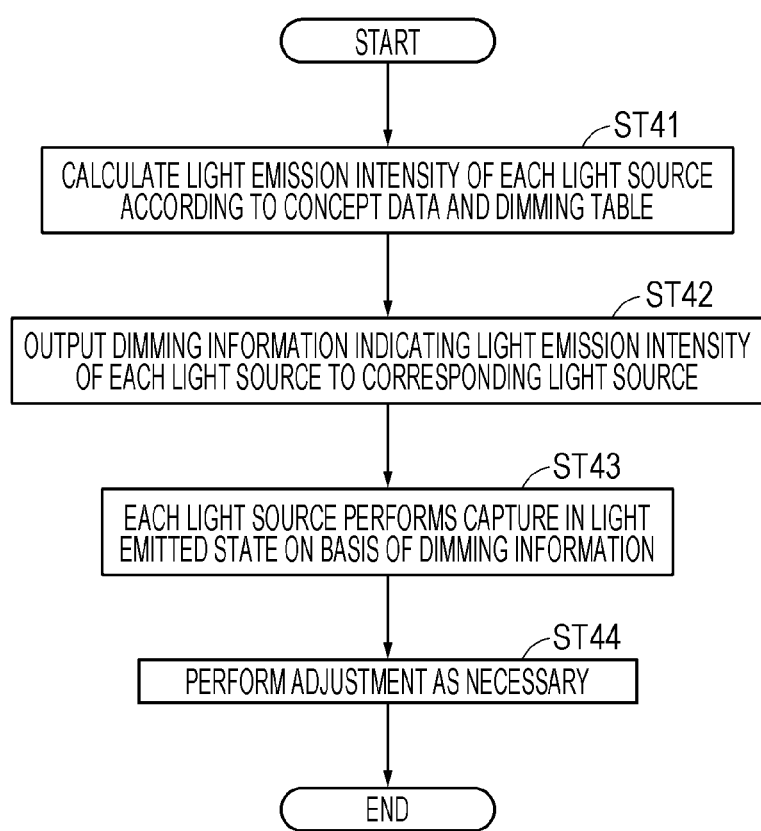
FIG. 10 is a flowchart illustrating an example of a processing flow of lighting setting and capture processing according to the first embodiment.

Next, the lighting setting and capture processing will be described. FIG. 10 is a flowchart illustrating an example of a processing flow of the lighting setting and capture processing. After the process is started, in step ST41, the dimming information generation unit 201B calculates and determines the light emission intensity of each light source according to the concept data and the dimming table TA1. The influence of light in a case where each light source emits light with certain light emission intensity on the image of the object is already known according to the dimming table TA1. Moreover, for example, in a case where light from the light source 3A and light from the light source 3B are emitted on a predetermined location, the brightness of the location becomes a sum of the brightness. For this reason, the dimming information generation unit 201B can determine how much light emission intensity is required for each light source to emit light in order to realize the brightness for each area specified in the concept data by reference to the dimming table TA1.

In the case of the concept data illustrated in FIG. 8, for example, the dimming information of the light source 3A is generated such that the light emission intensity of the light source 3A becomes "weak", the dimming information of the light source 3B is generated such that the light emission intensity of the light source 3B becomes "strong", and the dimming information of the light source 3C is generated such that the light emission intensity of the light source 3C becomes "medium". Note that, in a case where a composition that completely matches the composition based on the concept data cannot be realized, the dimming information is generated to realize a composition as close as possible to the composition based on the concept data. As an optimization method of obtaining an optimum lighting setting (dimming information) for the concept data, a quasi-Newton method, a downhill simplex method, a dual simplex method, a sequential linear quadratic programming, or the like can be applied. Then, the processing proceeds to step ST42.

In step ST42, the tablet computer 2 outputs the dimming information indicating the light emission intensity of each light source to the corresponding light source. For example, the tablet computer 2 transmits the dimming information to the corresponding light source, using the tablet communication unit 202. Then, the processing proceeds to step ST43.

In step ST43, the object 4 is captured in a state where each light source emits light on the basis of the dimming information. For example, the dimming information corresponding to the light source 3A is received by the light source communication unit 303A. The dimming control unit 302A causes the light emitting unit 301A to emit light with the light emission intensity "weak" on the basis of the received dimming information. Furthermore, the dimming information corresponding to the light source 3B is received by the light source communication unit 303B. The dimming control unit 302B causes the light emitting unit 301B to emit light with the light emission intensity "strong" on the basis of the received dimming information. Furthermore, the dimming information corresponding to the light source 3C is received by the light source communication unit 303C. The dimming control unit 302C causes the light emitting unit 301C to emit light with the light emission intensity "medium" on the basis of the received dimming information. Then, capture by the imaging device 1 is performed in the state where each light source emits light. An image obtained by the capture is displayed on the display 109 of the imaging device 1. The image obtained by the capture may be transmitted from the imaging device 1 to the tablet computer 2 and displayed on the display unit 203. Then, the processing proceeds to step ST44.

In step ST44, adjustment (fine adjustment) by the user is performed as necessary. As the adjustment, the user himself or herself may directly adjust the light emission intensity of some or all of the light sources. Furthermore, the concept data itself may be finely adjusted. Then, dimming information may be generated again on the basis of the concept data after fine adjustment, and capture may be performed again in the state where each light source emits light with the light emission intensity corresponding to the dimming information. Moreover, capture with changed light emission intensity of each light source may be performed a plurality of times.

Note that, in the above-described processing, capture and light emission need to be synchronized because the light source 3A and the light source 3B are flash light emission. The synchronization information for synchronization may be included in the dimming information or a light emission instruction may be given to the light source 3A and the light source 3B when the release button of the imaging device 1 is pressed in a state where the light source 3C continues to emit light. Furthermore, in the above-described processing, the dimming information for each light source has been generated. However, the dimming information may be information in which the light emission intensity of all the light sources is written, and each light source may select its own light emission intensity from the dimming information.

[Example of Effect Obtained in First Embodiment]

According to the above-described first embodiment, the settings of the light sources for obtaining a lighting effect desired by the user can be automatically performed. Furthermore, since a person who adjusts the light source is unnecessary, capture by a small number of people (one person in the minimum) is possible even if the lighting system becomes large.

Regardless of whether the setting is manually performed or performed by a simulation using a computer, the setting of the light source to obtain a desired lighting effect takes time and effort. Since a general lighting system uses a plurality of light sources, the settings takes more time and effort. However, according to the present embodiment, the user can reduce the time and effort required for the adjustment of the light sources and can perform efficient capture because the settings of the light sources can be performed by simply setting the concept data corresponding to the result of lighting capture, in other words, a desired image configuration (for example, the brightness for each area of the object). Furthermore, since the number of trials to adjust the light sources and cause the light sources to emit light can be reduced, the load on the light sources can be reduced and the durability of the light sources can be improved.

Furthermore, since capture is actually performed under lighting optimized for the concept, a high-quality image (still image in the present embodiment) that cannot be realized by image editing software can be obtained.

2. Second Embodiment

Next, a second embodiment according to the present disclosure will be described. Note that the matters described in the first embodiment can be applied to the second embodiment unless otherwise specified, and similarly, the same reference numerals are given to configurations of the same nature, and redundant description is appropriately omitted.

Problems to Consider when Capturing Moving Image Under Lighting

The second embodiment is an embodiment for automatically performing a setting of lighting for obtaining a lighting effect desired by a user when the user captures a moving image. Basic processing is similar to the processing in the first embodiment, and the setting for each light source is automatically performed on the basis of concept data set by the user.

Figure 11:
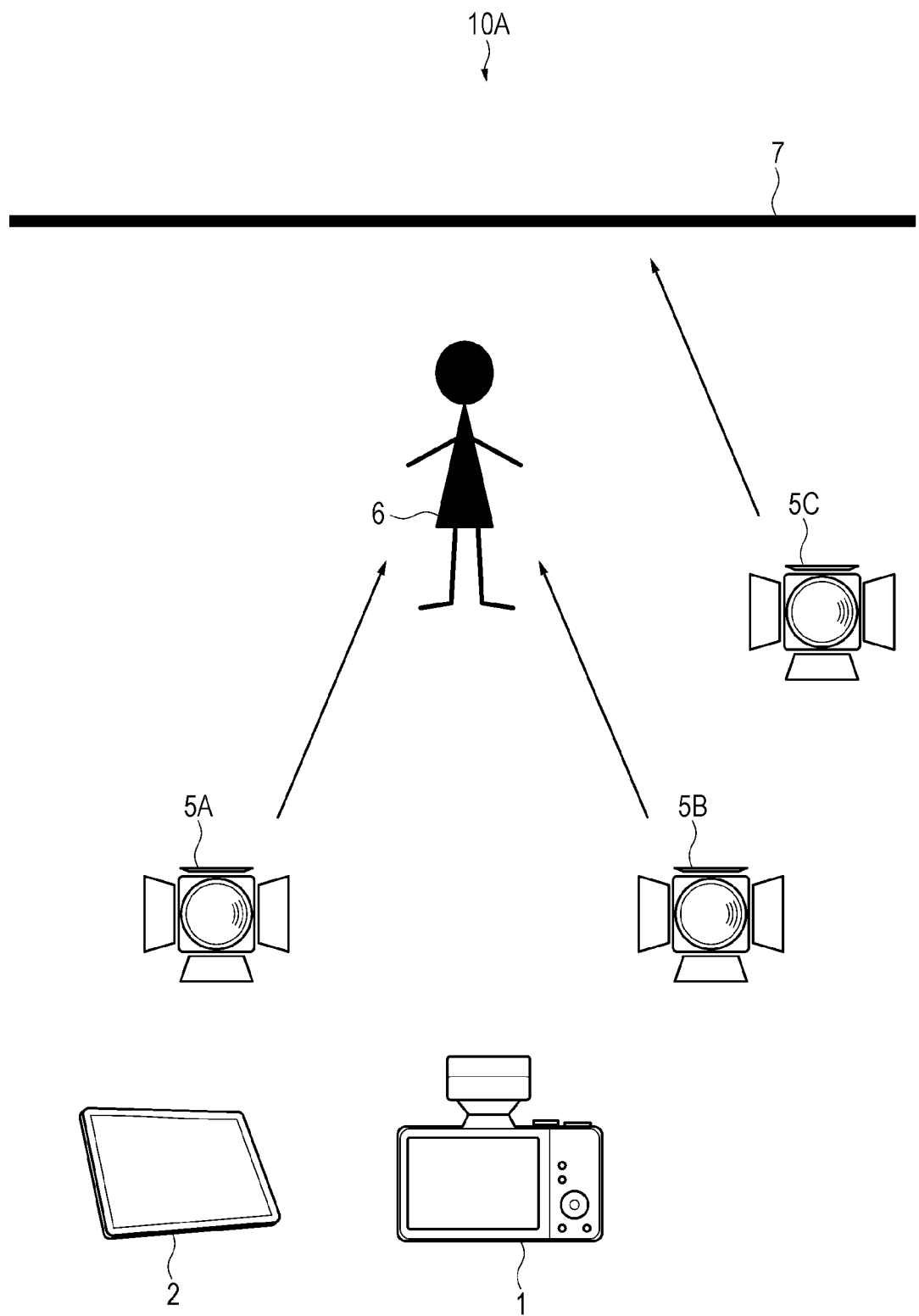
FIG. 11 is a diagram illustrating a configuration example of a lighting system according to a second embodiment.

By the way, in a case of capturing a moving image under lighting, a viewpoint specific to the moving image needs to be considered. FIG. 11 illustrates a lighting system (lighting system 10A) according to the second embodiment in which a moving image is captured under lighting. The lighting system 10A includes an imaging device 1 and a tablet computer 2 described in the first embodiment. Moreover, the lighting system 10A includes, for example, a light source 5A (fill light), a light source 5B (key light), and a light source 5C (backlight) as light sources. Note that, since a moving image is captured in the present embodiment, the light sources 5A to 5C emit steady light rather than flash light emission (instantaneous light)

In capturing a moving image, there are generally an object that moves (moving object) such as a person and an object that does not move such as a background. In the lighting system 10A illustrated in FIG. 11, a person 6 is illustrated as an example of the moving object and a wall 7 is illustrated as the background. The person 6 is mainly irradiated with light from the light source 5A and the light source 5B, and the wall 7 is mainly irradiated with light from the light source 5C.

The present embodiment assumes a case of capturing a state where the person 6 moves in a depth direction, more specifically, from the rear (depth side) toward the front (front side) with respect to the imaging device 1. It is assumed that the user desires a composition in which the brightness of the person 6 (brightness of reflected light) does not change with the movement of the person 6. In such a case, a method called a wiping method is generally used in which a light amount is adjusted to be constant while covering the light source with a diffuser. However, the wiping method requires a highly skilled technique. Therefore, in a case of arranging personnel capable of performing the wipe method in each light source, personnel capable of performing the wipe method need to be secured as a premise. Furthermore, the cost in capturing the moving image increases due to rewards and the like for the personnel. As described above, in the case of capturing a moving image under lighting, the problem of the increase in personnel and the increase in cost associated with the increase in personnel becomes more pronounced than the case of capturing a still image under lighting. Details of the second embodiment will be described on the basis of such a viewpoint.

[Configurations of Devices]

Since configurations of the imaging device 1 and the tablet computer 2 have been respectively described with reference to FIGS. 2 and 3, redundant description is omitted. Note that, although details will be described below, a control unit 201 controls determined settings regarding the light sources 5A to 5C to maintain structure data in a case where an object changes when capturing a moving image.

Figure 12:
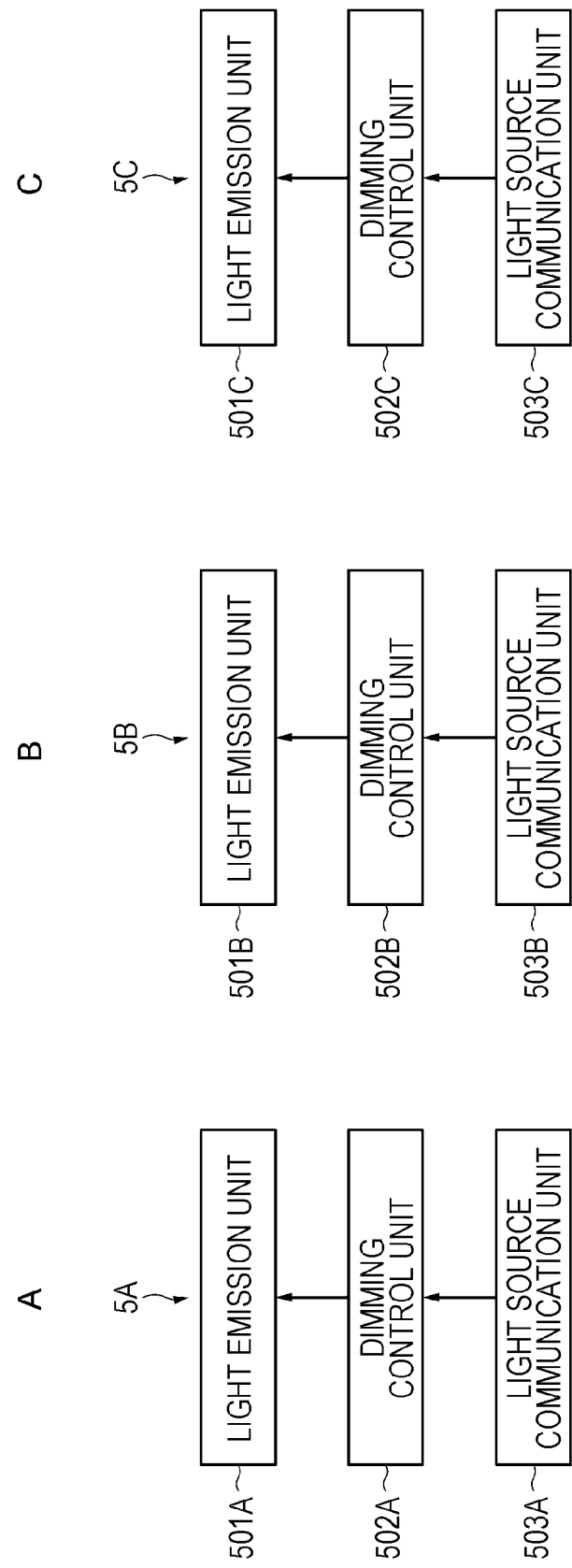
FIGS. 12A to 12C are block diagrams illustrating a configuration example of a light source according to the second embodiment.

FIGS. 12A to 12C illustrate configuration examples of the light sources 5A to 5C. The light source 5A includes a light emitting unit 501A, a dimming control unit 502A, and a light source communication unit 503A, similarly to the light source 3A. The light source 5B includes a light emitting unit 501B, a dimming control unit 502B, and a light source communication unit 503B, similarly to the light source 3B. The light source 5C includes a light emitting unit 501C, a dimming control unit 502C, and a light source communication unit 503C, similarly to the light source 3C. Note that, since the function of each unit is the same as the function of each unit in the light source 3A, redundant description is omitted. The light sources 5A to 5C are configured to emit light at three levels of light emission intensity, for example, "weak", "medium", and "strong".

[Processing Performed in Second Embodiment]

Next, processing performed in the second embodiment will be described, including an operation of each device. In the second embodiment, for convenience of description, processing is divided into three types of processing: "calibration processing", "concept data generation processing", and "lighting setting and capture processing", and then each type of the processing will be described in turn. The three types of processing do not need to be performed in the order described below, and the order of the processing may be changed within a range where no technical contradiction occurs, the processing may be performed in parallel, or each type of the processing may be continuously performed.

(Calibration Processing)

Figure 13:
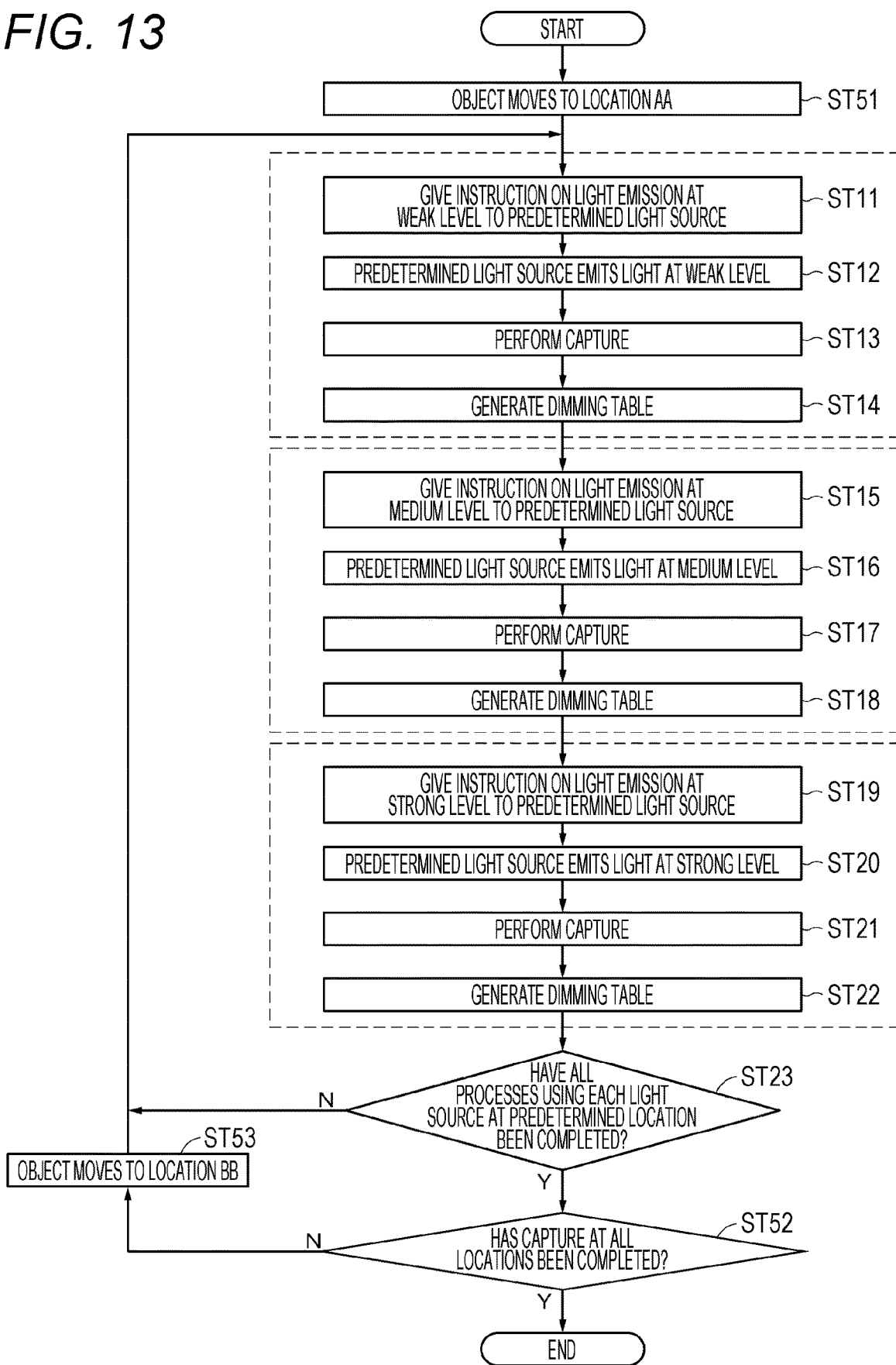
FIG. 13 is a flowchart illustrating an example of a processing flow of calibration processing according to the second embodiment.

First, the calibration processing according to the second embodiment will be described. FIG. 13 is a flowchart illustrating an example of a processing flow of the calibration processing according to the second embodiment. Note that processing similar to the processing described in the flowchart in FIG. 7 is denoted by the same reference numerals, and redundant description is omitted as appropriate.

After the processing is started, in step ST51, the person 6 as the moving object moves to a location AA. The location AA is, for example, a position where the person 6 starts moving. Then, in steps ST11 to ST22, for example, the light source 5A sequentially emits light with the light emission intensity "low", "medium", and "strong", and capture in each light emission state is performed. This capture may be a still image or a moving image. In each capture, image information corresponding to each light emission intensity is analyzed, and one element of a dimming table is generated by a dimming table generation unit 201A. When capture is completed, the processing proceeds to step ST23.

In step ST23, whether or not all the processing (capture) using each light source at a predetermined location (location AA in the present example) has been completed is determined. In the present example, processing using the light sources 5B and 5C has not been completed, the processing returns to step ST11. Then, in steps ST11 to ST22, for example, the light source 5B sequentially emits light with the light emission intensity "low", "medium", and "strong", and capture in each light emission state is performed. Furthermore, for example, the light source 5C sequentially emits light with the light emission intensity "low", "medium", and "strong", and capture in each light emission state is performed. In each capture, image information corresponding to each light emission intensity is analyzed, and one element of a dimming table is generated by a dimming table generation unit 201A. When capture is completed, the processing proceeds to step ST23.

Since the capture using the light sources 5A, 5B, and 5C in the state where the person 6 is in the location AA has been completed, determination in the processing in step ST23 is affirmative, and the process proceeds to step ST52. In step ST52, whether or not capture at all of locations has been completed is determined. In the present example, determination in the processing in step ST52 is negative, and the processing proceeds to step ST53.

In step ST53, the person 6 as a moving object moves to a location BB. The location BB is, for example, a position where the person 6 has finished moving, that is, a final stop position. Then, the processing returns to step ST11. Then, in steps ST11 to ST22, for example, the light source 5A sequentially emits light with the light emission intensity "low", "medium", and "strong", and capture in each light emission state is performed. In each capture, image information corresponding to each light emission intensity is analyzed, and one element of a dimming table is generated by a dimming table generation unit 201A. Similar processing is performed for the other light sources 5B and 5C. Then, the processing proceeds to step ST23.

In step ST23, whether or not all the processing (capture) using each light source at a predetermined location (location BB in the present example) has been completed is determined. In a case where capture using the light sources 5A, 5B, and 5C is completed, the processing proceeds to step ST52. As described above, in step ST52, whether or not capture at all of locations has been completed is determined. In the present example, capture locations are the two locations of the location AA that is a movement start position of the person 6 and the location BB that is a movement stop position. Therefore, the determination in step ST52 is affirmative, and the process ends.

Figures 14, 15:
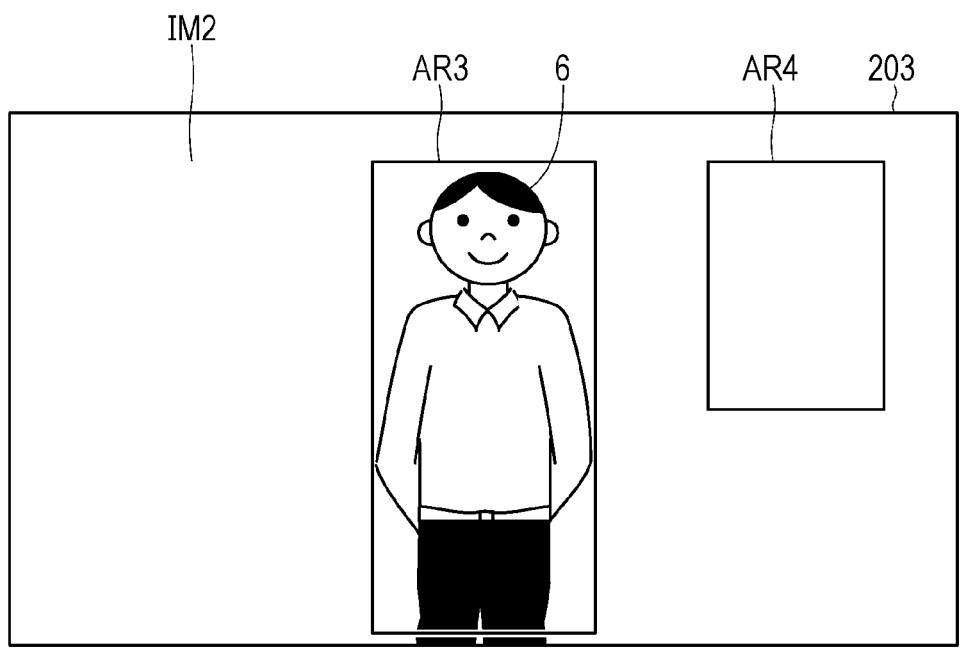
FIG. 14 is a diagram for describing an example of a dimming table according to the second embodiment.
FIG. 15 is a diagram for describing an example of a reference image and the like according to the second embodiment.

FIG. 14 illustrates an example of a dimming table (dimming table TA2) obtained by the calibration processing according to the second embodiment. The dimming table TA2 is a table in which the type of light source, the light emission intensity, position information of the person 6, and a luminance level of each pixel of an image captured at that time are associated with one another. Note that the position information of the person 6 can be expressed by various types of information. For example, known person extraction processing is performed on the basis of an image in capture, an area occupied by the person 6 (area where the person 6 is present) at the location AA is obtained, and the area may be used as the position information. Furthermore, distance information of the person 6 at each location may be used as the position information on the basis of a depth map obtained by a distance-measuring sensor or by image processing. Furthermore, the person 6 moves while holding a beacon and information transmitted from the beacon at each location may be used as the position information. Furthermore, combined information of the above pieces of information may be used as the position information.

Note that the dimming table TA2 has a larger information amount than the dimming table TA1 described in the first embodiment. Simply stated, the information is increased by the number of capture locations, and in the above-described example, capture is performed at the location AA and location BB, so the information amount in the dimming table TA2 is about twice the information amount in the dimming table TA1. Therefore, for example, the luminance level of each pixel of the dimming table TA2 may be compressed using a known compression technology. Furthermore, only the luminance levels of the pixels existing in an area set by concept data to be described below may be described in the dimming table TA2.

(Concept Data Generation Processing)

Next, the concept data generation processing according to the second embodiment will be described. The processing flow of the concept data generation processing according to the second embodiment is basically the same as the concept data generation processing according to the first embodiment. That is, a setting of the concept data using an input unit 204 is performed by the user in a state where a reference image is displayed on a display unit 203 of a tablet computer 2.

FIG. 15 is a diagram for describing an example of the concept data according to the second embodiment. A reference image IM2 is displayed on the display unit 203. The reference image IM2 is, for example, an image (still image) when the user is located at the location AA. This image may be an image obtained by the calibration processing or may be a separately captured image.

The user inputs the concept data using the input unit 204. For example, an area AR3 including the person 6 and a background area AR4 are specified. Then, for example, the concept data for maintaining the brightness of the person 6 and the background (the intensity of reflected light from the objects) is set by the user. Here, the brightness of the person 6 and the background at the capture start position (the state in which the moving object is at the location AA, which will be referred to as an initial state as appropriate in the following description) is also set as the concept data.

Note that the setting of the concept data is an example and is not limited to this example. For example, in the above-described example, a rectangular area has been illustrated. However, a person may be extracted and a setting for the person itself (for example, maintaining the brightness of the person) may be made. Furthermore, as in the above-described example, in the case of maintaining the brightness of the moving object and the background, concept data of "maintaining the brightness of all of objects (including the background)" may be simply set without setting areas. The object to be set in the concept data is set not only by the user but may also be automatically recognized by person extraction or face recognition.

(Lighting Setting and Capture Processing)

Figure 16:
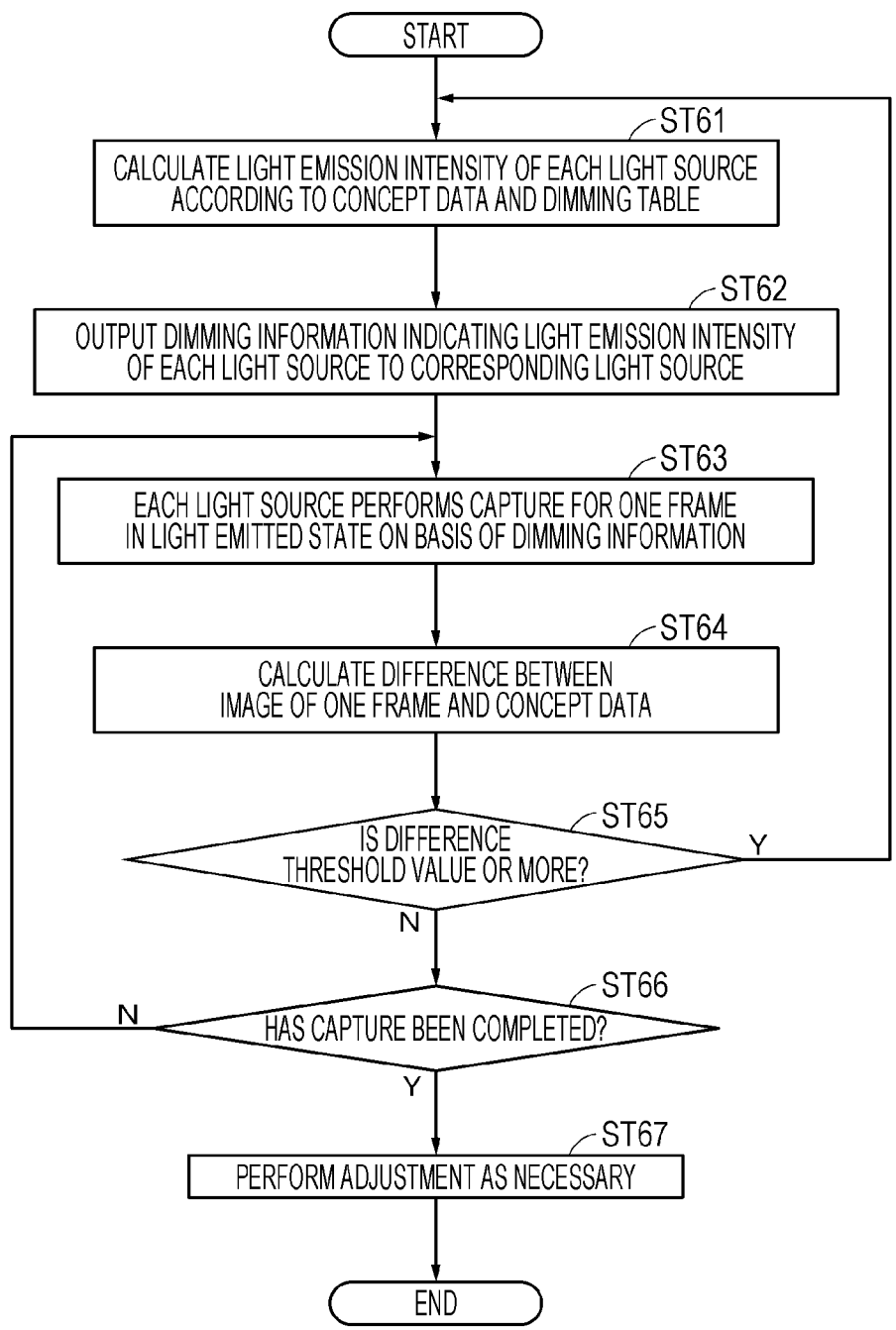
FIG. 16 is a flowchart illustrating an example of a processing flow of lighting setting and capture processing according to the second embodiment.

Next, the lighting setting and capture processing according to the second embodiment will be described. FIG. 16 is a flowchart illustrating an example of a processing flow of the lighting setting and capture processing. After the processing is started, in step ST61, a dimming information generation unit 201B generates dimming information indicating the light emission intensity of each light source on the basis of the concept data and the dimming table TA2. That is, the dimming information generation unit 201B generates the dimming information for each light source while referring to the dimming table TA2 such that the brightness of the person 6 and the background matches or approaches the brightness in the initial state indicated by the concept data. As described in the first embodiment, as an optimization method of obtaining an optimum lighting setting (dimming information) for the concept data, a quasi-Newton method, a downhill simplex method, a dual simplex method, a sequential linear quadratic programming, or the like can be applied. Then, the processing proceeds to step ST62.

In step ST62, the tablet computer 2 outputs the dimming information indicating the light emission intensity of each light source to the corresponding light source. For example, the tablet computer 2 transmits the dimming information to the corresponding light source, using the tablet communication unit 202. The dimming information corresponding to the light source 5A is received by the light source communication unit 503A. The dimming control unit 502A controls the light emission intensity of the light emitting unit 501A on the basis of the received dimming information. The dimming information corresponding to the light source 5B is received by the light source communication unit 503B. The dimming control unit 502B controls the light emission intensity of the light emitting unit 501B on the basis of the received dimming information. The dimming information corresponding to the light source 5C is received by the light source communication unit 503C. The dimming control unit 502C controls the light emission intensity of the light emitting unit 501C on the basis of the received dimming information. Then, the processing proceeds to step ST63.

In step ST63, capture of a moving image by the imaging device 1 is started in the state where each light source emits light on the basis of the dimming information, and an image for one frame is obtained as a result of the capture. The obtained image is transmitted from the imaging device 1 to the tablet computer 2. After the transmitted image is received by the tablet communication unit 202, the image is supplied to the control unit 201. Then, the processing proceeds to step ST64.

In step ST64, the control unit 201 calculates a difference between the image of one frame obtained in step ST64 and the concept data. An example of the difference calculation method will be described. The control unit 201 extracts a portion corresponding to the area AR3 including the person 6 from the image of one frame. Then, the control unit 201 compares an average value of the brightness (luminance) of each pixel in the area AR3 with an average value of the brightness of each pixel in the area AR3 in the initial state, and calculates the difference. Similar calculation is performed for the area AR4. Then, the processing proceeds to step ST65.

In step ST65, whether or not the difference regarding at least one of the areas AR3 or AR4 calculated in step ST64 is equal to or larger than a predetermined threshold value is determined. For example, the predetermined threshold value is appropriately set to a value that allows change in brightness to be visually recognized. In a case where the difference is not equal to or larger than the predetermined threshold value, the processing proceeds to step ST66.

In step ST66, whether or not capture of the moving image has been completed is determined. When capture of the moving image has been completed, the processing proceeds to step ST67, and adjustment (fine adjustment) for the captured moving image is performed as necessary. In the present example, since capture of only one frame has been completed, the determination in step ST66 is negative, and the processing returns to step ST63. Then, the processing of steps ST63 and ST64 is performed for one frame to be captured next.

The present embodiment assumes the case in which the person 6 moves from the depth toward the front, as described above. As the person 6 approaches the front side, the distance between the light source 5A and the light source 5B and the person 6 decreases, in other words, the person 6 becomes brighter. Therefore, the processing in step ST65 becomes affirmed at certain timing. In this case, the processing returns to step ST61.

In step ST61, the dimming information generation unit 201B recalculates the dimming information. That is, the dimming information generation unit 201B recalculates the dimming information while referring to the dimming table TA2 such that the brightness of the person 6 and the background matches the brightness indicated by the concept data at the current position of the person 6. Conceptually, the light emission intensity of the light source 5A and the light source 5B is reduced. However, the brightness of the background decreases, and the concept data cannot be realized. Accordingly, the light emission intensity of the light source 5C is increased. Thereby, in a case where change occurs due to the movement of the person 6, the setting regarding each light source can be controlled to maintain the concept data. More specifically, the brightness of the person 6 and the background can be maintained according to the concept data. Then, the processing proceeds to step ST62, and the dimming information indicating the light emission intensity of each light source is output (transmitted) from the tablet computer 2 to each corresponding light source. Then, capture of a moving image is performed in a state where each light source emits light on the basis of the recalculated dimming information. The above-described processing is repeated during the capture of the moving image.

Note that, in the dimming table TA2 illustrated in FIG. 14, only image information of when the person 6 is present at the two locations AA and BB is described. Therefore, an influence of light emission with light emission intensity by a certain light source on the object at a location between the location AA and the location BB (hereinafter, the location is referred to as a location CC as appropriate. Note that the location CC can be an arbitrary position) can be interpolated using the information of the location AA and the location BB. For example, in a case where the light source 5A emits light with the light emission intensity "weak", the luminance level of a pixel in a range occupied by the person 6 at the location CC may be predicted using the luminance level of a pixel in a case where the light source 5A emits light with the light emission intensity "weak" in a state where the person 6 is present at the location AA, and the luminance level of a pixel in a case where the light source 5A emits light with the light emission intensity "weak" in a state where the person 6 is present at the location BB. Furthermore, the luminance level of a pixel in a case where a certain light source emits light with certain light emission intensity may be predicted in a state where the person 6 is present at the location CC, using change in spatial position of the person 6 (change in depth information).

Note that a plurality of the locations CC is set, and the luminance level of each pixel in a case where a certain light source emits light with certain light emission intensity may be acquired in advance by the above-described calibration processing at the location CC. Thereby, the load of the processing of recalculating the dimming information can be reduced. The setting of the plurality of locations CC between the location AA and the location BB may be set by the user or may be automatically set as appropriate. For example, in a case where change equal to or larger than a threshold value is detected in the brightness of the person 6 in a case where the light source 3A emits light with the light emission intensity "weak", position information of the position, the light source, the light emission intensity of the light source, and the luminance level of each pixel may be described in the dimming table TA2 in association with one another.

Note that the degree of change in brightness associated with movement between frames is slight. Therefore, the processing in steps ST63 to ST65 may be performed in arbitrary units (for example, in units of 10 frames) rather than in units of one frame.

[Example of Effect Obtained in Second Embodiment]

By performing the above-described processing, the settings of the light sources are automatically performed to maintain the concept data even in a case where a moving object is present in an object, and a difference occurs between an image obtained according to movement of the moving object and the concept data. Therefore, according to the second embodiment, the settings of the light sources for obtaining a lighting effect desired by the user can be automatically performed even in the case of capturing a moving image. Furthermore, a moving image that matches the concept data can be obtained regardless of the speed at which the person 6 moves. Moreover, similar effects to the effects exemplified in the above-described first embodiment can be obtained.

3. Modification

The plurality of embodiments of the present disclosure has been specifically described. However, content of the present disclosure is not limited to the above-described embodiments, and various modifications based on the technical idea of the present disclosure can be made. Hereinafter, modifications will be described. Note that the modifications to be described below can be applied to the first and second embodiments unless otherwise specified or within a range where no technical contradiction occurs.

In the above-described embodiments, a plurality of concept data may be set, and a plurality of pieces of dimming information corresponding to the respective concept data may be generated. Then, capture may be performed a plurality of times in a state where the light sources emit light on the basis of the respective plurality of pieces of dimming information.

An image based on the concept data and an image obtained by actual capture may be different by a predetermined amount or more due to a performance limit of a light source or the like. In such a case, a warning or an error may be given in notification. As an example, pixel values of pixels constituting the image based on the concept data and pixel values of pixels constituting the image obtained by actual capture are compared, and in a case where there is a certain number of pixels having a difference that is equal to or larger than a threshold value, the images are determined to be different by a predetermined amount or more. Notification of a warning or an error is performed by sound, display, vibration, or the like.

In the above-described embodiments, settings such as a shutter speed, sensitivity, and an aperture of the imaging device 1 may be changed. Such settings for the imaging device 1 may be performed according to user's preference such as widening the aperture to blur the background, or may be performed to compensate for the performance limit of a light source.

In the above-described embodiments, the light sources may be built in the imaging device 1 or attachable/detachable to/from the imaging device 1, or may be lights that are small enough to be held in hand by the user. Furthermore, capture may be performed indoors or outdoors, and part of the light sources may be ambient light (natural light) such as sunlight. Furthermore, the shapes, sizes, and arrangement positions of the light sources are merely schematically illustrated, and are not limited to the examples illustrated in the above-described embodiments. Furthermore, the number of light sources is not limited to three. Although several tens of light sources may be used in a large-scale production site, the present technology can be applied to such a large-scale lighting system. Furthermore, part of the light sources may be ambient light, and another one or a plurality of the light sources may be lights.

In the above-described embodiments, the processing of obtaining the dimming information may be performed by another device (for example, a cloud computer) instead of the tablet computer 2. Furthermore, the processing of obtaining the dimming information may be performed by the imaging device 1. Furthermore, the imaging device 1 or other device may have a part or all of the functions of the tablet computer 2. Furthermore, in a case where the tablet computer 2 has an imaging function, the tablet computer 2 may capture images instead of the imaging device 1. In this case, the control unit 201 of the tablet computer 2 may have the function of the camera control unit 107 of the imaging device 1. As described above, which device has the configuration that realizes the functions in the above-described embodiments can be changed as appropriate.

The configuration for performing communication (for example, the tablet communication unit 202) may be a communication adapter or the like that is attachable/detachable to/from the tablet computer 2.

The location where the input using the tablet computer 2 is performed and the location where the capture is performed may not be in the same space but may be different locations. For example, a person responsible for determining the concept inputs the concept data using the tablet computer 2 at home or the like, and transmits the concept data to a studio where the capture is performed. A device installed in the studio may perform capture after generating the dimming information for each light source on the basis of the dimming table and the concept data and controlling the light emission intensity of the light source and the like. This eliminates the need for the person responsible for determining the concept to go to the location where the capture is performed.

In the above-described second embodiment, an example of maintaining the brightness of the person and the background has been described as an example of the concept data. However, the concept data is not limited to the example. For example, the concept data may be concept data in which change in brightness is specified. Specifically, concept data in which a person becoming brighter or darker with movement of the person is specified may be the concept data. Then, as described in the above-described second embodiment, the setting of each light source is appropriately changed to cancel a difference from the concept data caused by the movement of the person, and the concept data is realized. Moreover, the concept data may include, for example, time information such as how much a person becomes bright after a predetermined time.

In the second embodiment, in a case where a recording rate of the imaging device 1 is 60 frames per second (fps) and an imaging rate is high speed such as 120 fps or 240 fps, the calibration processing and the processing of recalculating the dimming information may be performed using an image not used for recording.

In the above-described second embodiment, the movement of the person 6 has been described using the front-rear direction as an example. However, a left-right direction, a diagonal direction, a combined direction of the aforementioned directions, or the like may be used.

The present disclosure can also be realized by a device, a method, a program, a system, and the like. For example, a program for performing the functions described in the embodiments is made downloadable, and a device not having the control function described in the embodiments downloads and installs the program, thereby becoming able to perform the control described in the embodiments. The present disclosure can also be realized by a server that distributes such a program.

In the above-described embodiments, the number of light emission patterns of each light source in the calibration processing is set to one type, and light emission intensity obtained by a through the lens (TTL) automatic dimming function of the imaging device may be used as the light emission intensity of the light emission pattern of each light source. At that time, it is favorable to perform capture under only ambient light that is not emitted by all the light sources.

In the above-described embodiments, the user may be notified in a case where an image obtained by capture in the calibration processing includes an area that is over-exposed or under-exposed, exceeding an upper limit or a lower limit of the luminance value. The image obtained by capture may be displayed at the time of notification and the area that is over-exposed or under-exposed may be displayed in an emphasized manner.

In the above-described embodiments, in a case where the color temperature of each light source in the calibration processing is different, the color temperature of each light may be multiplied by a coefficient to suppress an influence by a different in color temperature and used. Furthermore, in a case where the color temperature is different depending on the light emission amount even in the same light source, the color temperature may be multiplied by a coefficient according to the light emission amount and used.

In the above-described embodiments, an example of creating the dimming table from the image obtained by capture in the calibration processing has been described. However, the embodiments are not limited to the example. For example, the image information obtained by capture may be used as it is without being converted into the dimming table. The image information used at that time is favorably a raw image for securing the number of colors represented by a bit depth of a simulation image and gradation in order to avoid an influence of gamma.

In the above-described embodiments, an example of using the optimization method as described above for obtaining optimum dimming information in the lighting setting and capture processing has been described. However, in a case of applying the image information obtained by capture as it is to the lighting setting and capture processing, the lighting setting and capture processing may be performed by a different method. Specifically, a simulation image of results of lighting capture is generated by comparative bright combination of images obtained by capture, and the user confirms the generated image. As a result of the confirmation, in a case where the generated image is a desired simulation image, the dimming information for obtaining a capture result similar to the generated simulation image is transmitted to each light source in response to a user operation. On the other hand, in a case where the generated image is not the desired simulation image as a result of the confirmation, adjustment is performed to obtain a simulation image desired by the user by changing a coefficient for the luminance value of each image to be used for comparative bright combination in response to the user operation. The dimming information for obtaining a capture result similar to the simulation image after user adjustment is transmitted to each light source in response to the user operation after completion of the user adjustment.

By using the described-above comparative bright combination, an ambient light component and a light emission component from each light source can be separately calculated. Corresponding pixel values are compared between a captured image under only the ambient light and a light emitted image, the light emission component can be obtained by acquiring a larger pixel value. Since the relationship between the light emission intensity of a light source and obtained reflected light is represented by a linear function with a slope of 1 in a log-log graph, the light emission component can be calculated. This greatly reduces the calculation amount in the simulation. Furthermore, as the method of comparative bright combination, color comparative bright combination that performs comparison with a total value of RGB may be used.

Furthermore, the simulation image may be displayed on the display unit 203 for the user to confirm the simulation image by the comparative bright combination described above, as illustrated in FIG. 17, for example. At that time, the image captured under only ambient light may be displayed as the reference image IM3 in the initial state, or a simulation image by preset predetermined comparative bright combination may be displayed. At that time, a comparative bright combination image selection unit 601 for selecting image information to be used for comparative bright combination and a coefficient setting unit 602 for setting a coefficient for the luminance value of each piece of image information may be simultaneously displayed with the IM3. Thereby, the user can operate the comparative bright combination image selection unit 601 and the coefficient setting unit 602 while referring to the reference image IM3, thereby adjusting a desired simulation image based on the user's own concept. Furthermore, the display unit 203 may display a light source information display unit 603 for displaying information of each connected light source, a recalibration instruction unit 604 for giving an instruction on recalibration, a main capture instruction unit 605 for transmitting the dimming information to each light source and proceeding to main capture, and a simulation image output unit 606 for outputting a simulation image being displayed as a completed image.

Here, the comparative bright combination may be performed between the image information captured under only ambient light and light emission pattern image information of each light source, or may be performed between the image information captured under only ambient light and image information of a difference in luminance value between the light emission pattern image information of each light source and the image information captured under only ambient light. Thereby, an influence of a difference of the ambient light depending on the time of capturing the image information to be used for comparative bright combination can be reduced.

In the above-described embodiments, when change in a light exposure state of an object is detected by each light source, the imaging device, or the information processing apparatus, part or all of the calibration processing, the concept data generation processing, and the lighting setting and capture processing may be performed again. Alternatively, part or all of the processes of the calibration processing, the concept data generation processing, and the lighting setting and capture processing may be performed again by a user operation. Here, the light exposure state of an object can be considered to change by change in increase/decrease in the number of light sources, movement of the position of the object or the light source, change in reflectance of the object itself, change in a setting value of the imaging device or the light source, attachment/detachment of an accessory such as a diffuser, or change in weather or ambient light. Each light source, the imaging device, or the information processing apparatus detects the change in the light exposure state of the object by detection of a user operation, various sensors, change in a captured image, or the like. In the case of detecting the change in the light exposure state of the object by the detection of a user operation, various sensors, change in a captured image, or the like, part or all of various types of processing may be automatically performed again, or the change in the light exposure state of the object may be given in notification to the user.

The present disclosure can also employ the following configurations.

(1)

An information processing apparatus including:

a control unit configured to determine a setting of a light emitting unit according to concept data indicating a characteristic of a desired image and a light emission result of the light emitting unit, in which the control unit controls the determined setting to maintain the concept data in a case where change in an object has occurred.

(2)

The information processing apparatus according to (1), in which the concept data is data indicating brightness specified for each area of the object.

(3)

The information processing apparatus according to (1) or (2), in which the control unit generates a dimming table corresponding to the light emission result of the light emitting unit on the basis of image information of an image obtained in a case where the light emitting unit has emitted light in a predetermined light emission pattern.

(4)

The information processing apparatus according to (3), in which the light emission pattern is light emission intensity of the light emitting unit.

(5)

The information processing apparatus according to (3) or (4), in which the control unit generates the dimming table corresponding to the light emission result of the light emitting unit on the basis of position information of a moving object included in the object.

(6)

The information processing apparatus according to (5), in which the control unit uses image information corresponding to predetermined light emission intensity and predetermined position information to generate image information corresponding to position information different from the predetermined position information.

(7)

The information processing apparatus according to (3), in which the light emission pattern is a color temperature of the light emitting unit.

(8)

The information processing apparatus according to any one of (3) to (7), in which the image information is spatial sensor information corresponding to the light emission pattern of the light emitting unit.

(9)

The information processing apparatus according to (8), in which the image information is a luminance level in a pixel unit or a unit of a block having an arbitrary size.

(10)

The information processing apparatus according to any one of (1) to (9), further including:

an input unit configured to accept an input for generating the concept data.

(11)

The information processing apparatus according to (10), further including:

a display unit configured to display a reference image to be referred to when the input is accepted.

(12)

The information processing apparatus according to any one of (1) to (11), in which the setting of the light emitting unit is a setting regarding at least one of light emission intensity of the light emitting unit, a color temperature of light emitted from the light emitting unit, softness/hardness of the light, an irradiation range of the light, or an irradiation direction of the light.

(13)

The information processing apparatus according to any one of (1) to (12), further including:

an output unit configured to output the setting of the light emitting unit.

(14)

The information processing apparatus according to any one of (1) to (13), in which the object is at least one of an object specified by a user or an automatically recognized object.

(15)

An information processing method including:

determining a setting of a light emitting unit according to concept data indicating a characteristic of a desired image and a light emission result of the light emitting unit; and controlling the determined setting to maintain the concept data in a case where change in an object has occurred.

(16)

A program for causing a computer to execute processing of:

determining a setting of a light emitting unit according to concept data indicating a characteristic of a desired image and a light emission result of the light emitting unit; and controlling the determined setting to maintain the concept data in a case where change in an object has occurred.

(17)

A lighting system including:

an information processing apparatus; and a light emitting unit, the information processing apparatus including a control unit configured to determine a setting of a light emitting unit according to concept data indicating a characteristic of a desired image and a light emission result of the light emitting unit, and control the determined setting to maintain the concept data in a case where change in an object has occurred, and an output unit configured to output the setting to the light emitting unit, the light emitting unit including a light emission control unit configured to control light emission based on the setting output from the information processing apparatus.

(18)

The lighting system according to (17), in which the information processing apparatus calculates the light emission result of the light emitting unit using an image that is not to be recorded.

REFERENCE SIGNS LIST

1 Imaging device
2 Tablet computer
3A to 3C, 5A to 5C Light source
10 Lighting system
107 Camera control unit
201 Control unit
201A Dimming table generation unit
201B Dimming information generation unit
202 Tablet communication unit
203 Display unit
204 Input unit
303A to 303C, 503 to 503C Light source communication unit

The invention claimed is:

1. An information processing apparatus comprising:
a control circuitry configured to
receive concept data provided by a user, the concept data indicating one or more characteristics of a desired image,
receive a light emission result of a light emitting unit that emits light on an object,
determine a setting of the light emitting unit based on the concept data and the light emission result,
determine whether a change in the object has occurred,
control the light emitting unit with the setting that is determined in response to determining that the change in the object has not occurred,
re-determine the setting of the light emitting unit that emits the light on the object in response to determining that the change in the object has occurred, and
control the light emitting unit with the setting that is re-determined in response to determining that the change in the object has occurred.

2. The information processing apparatus according to claim 1, wherein
the one or more characteristics of the desired image includes a brightness specified for each area of the object.

3. The information processing apparatus according to claim 1, wherein
the control circuitry is further configured to generate a dimming table corresponding to the light emission result of the light emitting unit on a basis of image information of an image obtained in a case where the light emitting unit has emitted light in a predetermined light emission pattern.

4. The information processing apparatus according to claim 3, wherein
the predetermined light emission pattern is a light emission intensity of the light emitting unit.

5. The information processing apparatus according to claim 4, wherein
the control circuitry is further configured to generate the dimming table corresponding to the light emission result of the light emitting unit on a basis of position information of a moving object included in the object.

6. The information processing apparatus according to claim 5, wherein
the control circuitry is further configured to generate position information based on image information corresponding to a predetermined light emission intensity and predetermined position information, the position information is different from the predetermined position information.

7. The information processing apparatus according to claim 3, wherein
the predetermined light emission pattern is a color temperature of the light emitting unit.

8. The information processing apparatus according to claim 6, wherein
the image information is spatial sensor information corresponding to the predetermined light emission pattern of the light emitting unit.

9. The information processing apparatus according to claim 8, wherein
the image information is a luminance level in a pixel unit or a unit of a block having an arbitrary size.

10. The information processing apparatus according to claim 1, further comprising:
input circuitry configured to accept an input from a user to generate the concept data.

11. The information processing apparatus according to claim 10, further comprising:
a display unit configured to display a reference image to be referred to when the input is accepted.

12. The information processing apparatus according to claim 1, wherein
the setting of the light emitting unit is a setting regarding at least one of light emission intensity of the light emitting unit, a color temperature of light emitted from the light emitting unit, softness/hardness of the light, an irradiation range of the light, or an irradiation direction of the light.

13. The information processing apparatus according to claim 1, further comprising:
communication circuitry configured to communicate the setting to the light emitting unit.

14. The information processing apparatus according to claim 1, wherein the object is specified by a user or the object is automatically recognized by the control circuitry.

15. An information processing method comprising:

receiving, with a control circuitry, concept data provided by a user, the concept data indicating one or more characteristics of a desired image;

receiving, with the control circuitry, a light emission result of a light emitting unit that emits light on an object;

determining, with the control circuitry, a setting of the light emitting unit based on the concept data and the light emission result;

determining, with the control circuitry, whether a change in the object has occurred;

controlling, with the control circuitry, the light emitting unit with the setting that is determined in response to determining that the change in the object has not occurred;

re-determining, with the control circuitry, the setting of the light emitting unit that emits the light on the object in response to determining that the change in the object has occurred; and controlling, with the control circuitry, the light emitting unit with the setting that is re-determined in response to determining that the change in the object has occurred.

16. A non-transitory computer-readable medium including a program that, when executed by a computer, causes the computer perform a set of operations comprising:

receiving concept data provided by a user, the concept data indicating one or more characteristics of a desired image;

receiving a light emission result of a light emitting unit that emits light on an object;

determining a setting of the light emitting unit based on the concept data and the light emission result;

determining whether a change in the object has occurred;

controlling the light emitting unit with the setting that is determined in response to determining that the change in the object has not occurred;

re-determining the setting of the light emitting unit that emits the light on the object in response to determining that the change in the object has occurred; and controlling the light emitting unit with the setting that is re-determined in response to determining that the change in the object has occurred.

17. A lighting system comprising:

a light emitting unit configured to emit light on an object based on a setting; and an information processing apparatus including a control circuitry configured to receive concept data provided by a user, the concept data indicating one or more characteristics of a desired image, receive a light emission result of the light emitting unit, determine the setting of the light emitting unit based on the concept data and the light emission result, determine whether a change in the object has occurred, control the light emitting unit with the setting that is determined in response to determining that the change in the object has not occurred, re-determine the setting of the light emitting unit in response to determining that the change in the object has occurred, and control the light emitting unit with the setting that is re-determined in response to determining that the change in the object has occurred, and communication circuitry configured to output the setting to the light emitting unit.

18. The lighting system according to claim 17, wherein the information processing apparatus calculates the light emission result of the light emitting unit using an image that is not to be recorded.

* * * * *